(12) United States Patent
Guha et al.

(10) Patent No.: US 10,445,801 B2
(45) Date of Patent: Oct. 15, 2019

(54) SYSTEM THAT DYNAMICALLY DETERMINES SOLD-TO LEGAL ENTITIES

(71) Applicant: Oracle International Corporation, Redwood Shores, CA (US)

(72) Inventors: Suman Guha, Fremont, CA (US); Valerie Jeanne Dubois, Moss Beach, CA (US); Neil Ramsay, Las Rozas (ES); Shibhu Nambiar, Edison, NJ (US); Kalyana Chakravarthy Dande, Hyderabad (IN); Karthik Natarajan, Bangalore (IN); Shyam Sundar Santhanam, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 487 days.

(21) Appl. No.: 14/658,520

(22) Filed: Mar. 16, 2015

(65) Prior Publication Data
US 2016/0019631 A1    Jan. 21, 2016

Related U.S. Application Data

(60) Provisional application No. 62/024,858, filed on Jul. 15, 2014.

(51) Int. Cl.
| G06Q 30/00 | (2012.01) |
| G06Q 30/06 | (2012.01) |
| G06Q 50/18 | (2012.01) |

(52) U.S. Cl.
CPC ..... *G06Q 30/0617* (2013.01); *G06Q 30/0635* (2013.01); *G06Q 50/18* (2013.01)

(58) Field of Classification Search
None
See application file for complete search history.

(56) References Cited

U.S. PATENT DOCUMENTS

| 7,171,694 B1 | 1/2007 | Jespersen et al. |
| 7,698,231 B2 | 4/2010 | Clinesmith et al. |
| 7,761,385 B2 | 7/2010 | Hutchison et al. |

(Continued)

FOREIGN PATENT DOCUMENTS

| WO | 02057889 A2 | 7/2002 |

OTHER PUBLICATIONS

Using Procurement. (2011-2015). Retrieved from https://docs.oracle.com/cd/E51367_01/procurementop_gs/OAPRC/F1007479AN1C5D1.htm (Year: 2015).*

(Continued)

*Primary Examiner* — Abby J Flynn
(74) *Attorney, Agent, or Firm* — Potomac Law Group, PLLC

(57) ABSTRACT

A system is provided that dynamically determines a sold-to legal entity associated with an electronic financial document. The system receives a request to generate the electronic financial document and qualifiers including attributes of the electronic financial document. The system further selects a supply chain financial orchestration flow based on programmable business rules and the qualifiers. The system further selects a sold-to legal entity that is defined by the selected supply chain financial orchestration flow. The system further generated the electronic financial document comprising the selected sold-to legal entity.

17 Claims, 20 Drawing Sheets

(56) References Cited

U.S. PATENT DOCUMENTS

| | | | |
|---|---|---|---|
| 8,271,361 | B2 | 9/2012 | Nambiar et al. |
| 2002/0026373 | A1* | 2/2002 | Kamath ................ G06Q 30/06 705/26.43 |
| 2002/0156695 | A1 | 10/2002 | Edwards |
| 2003/0033228 | A1 | 2/2003 | Bosworth-Davies et al. |
| 2003/0233289 | A1 | 12/2003 | Yang et al. |
| 2004/0044591 | A1 | 3/2004 | Gilliland et al. |
| 2004/0073507 | A1 | 4/2004 | Scott et al. |
| 2005/0091236 | A1* | 4/2005 | Muno ................ G06F 17/3061 |
| 2005/0203766 | A1 | 9/2005 | Donaldson |
| 2005/0240493 | A1* | 10/2005 | Johnson ................ G06Q 30/06 705/26.41 |
| 2008/0215506 | A1 | 9/2008 | Annadurai et al. |
| 2010/0299268 | A1 | 11/2010 | Guha et al. |
| 2011/0066455 | A1* | 3/2011 | Lobo ................ G06Q 30/0603 705/7.35 |
| 2011/0153548 | A1 | 6/2011 | Varghese et al. |
| 2013/0311338 | A1 | 11/2013 | Bhaowal et al. |
| 2014/0089150 | A1 | 3/2014 | Wong et al. |
| 2014/0095238 | A1 | 4/2014 | Dande et al. |
| 2014/0095246 | A1 | 4/2014 | Natarajan et al. |
| 2014/0095247 | A1 | 4/2014 | Natarajan et al. |
| 2014/0095248 | A1 | 4/2014 | Duvaragamani et al. |
| 2014/0095249 | A1 | 4/2014 | Tarakad et al. |
| 2014/0095266 | A1 | 4/2014 | Dande et al. |
| 2014/0095343 | A1 | 4/2014 | Daniel et al. |
| 2014/0095361 | A1 | 4/2014 | Santhanam et al. |
| 2014/0095373 | A1 | 4/2014 | Natarajan et al. |

OTHER PUBLICATIONS

Oracle ERP Apps Guide, "A Guide to Oracle Apps 11i/R12 Functional and Technical Materials", Multi Org (Multiple Organizations), http://www.oracleerpappsguide.com/2012/01/multi-orgmultiple-organizations.html, last downloaded May 20, 2014.

OracleApps Epicenter, "Understanding Multi-Organization Structure in EBS; Odyssey of an Oracle Apps Consultant", http://www.oracleappshub.com/beginner/understanding-multi-organization-structure-in-ebs-part-1/, last downloaded May 20, 2014.

Microsoft Dynamics, "Multi-Entity—Core Software", http://corerealestatesoftware.com/property-management-for-microsoft-dynamics/industrial-office-retail/multi-entity-management/, last downloaded May 19, 2014.

Technet Microsoft, "About intercompany parameters [AX 2012]", http://technet.microsoft.com/en-us/library/aa573449.aspx, last downloaded May 20, 2014.

Technet Microsoft, "Create and invoice an intercompany purchase order for internal use [AX 2012]", http://technet.microsoft.com/en-us/library/aa498226.aspx, last downloaded May 20, 2014.

Technet Microsoft, "Create or modify a legal entity [AX 2012]", http://technet.microsoft.com/en-us/library/hh242184.aspx, last downloaded May 19, 2014.

Oracle, "Inter company invoicing across legal entities within operating unit", http://india.oaug.org/file/ICLE1360077551.pdf, last downloaded Feb. 2, 2015.

Leveragetech, "SAP Business One Intercompany", http://leveragetech.com.au/sap-business-one-intercompany-a-solution-for-your-multi-company-sap-business-one-requirements/, last downloaded May 20, 2014.

JobPro Central, "Apple Resellers", http://www.jobprocentral.com/apple-resellers.html, last downloaded May 19, 2014.

Sunny's Blog on Dynamics AX, "Linking employees to multiple legal entities and it's implications", http://daxing2012.wordpress.com/2013/03/12/linking-employees-to-multiple-legal-entities-and-its-implications/, last downloaded May 19, 2014.

Schlumberger, "Procure to Pay Process—Supplier Information Kit 2011", http://www.slb.com/~/media/Files/resources/supply/supply_info_kit_en_0811.pdf, last downloaded May 19, 2014.

Microsoft Dynamics, "Multi-Entity Management for Microsoft Dynamics™ GP", http://www.binarystream.com/documents/Multi-Entity_Management_Brochure.pdf, last downloaded May 19, 2014.

Agrium, "legal entities for billing", http://www.agriumwholesale.com/includes/How_to_Get_Paid_by_Agrium.pdf, last downloaded May 19, 2014.

HP Supplier Portal, "Paper Invoices", https://h20168.www2.hp.com/supplierextranet/ob10paper.do, last downloaded May 19, 2014.

BeanworksAP, "Why Choose BeanworksAP?, For powerful multi-entity, purchase-to-pay, AP automation", http://www.beanworks.com/accounts-payable-invoice-automation-software/, last downloaded May 19, 2014.

* cited by examiner

SYSTEM THAT DYNAMICALLY DETERMINES SOLD-TO LEGAL ENTITIES

CROSS-REFERENCE TO RELATED APPLICATIONS

This application claims priority of U.S. Provisional Patent Application Ser. No. 62/024,858, filed on Jul. 15, 2014, the subject matter of which is hereby incorporated by reference.

FIELD

One embodiment is directed to a computer system, and more particularly, to a computer system that automatically generates financial documents, such as purchase orders.

BACKGROUND

A purchase order is a contractually binding document between a buying organization and a selling organization. It contains information pertaining to goods and/or services that a buying organization commits to buy, where the information can include, for example, an item, a description of a service, a quantity, and a price.

A "legal entity" is an association, corporation, partnership, proprietorship, trust, individual, or other type of entity that has legal standing in the eyes of the law. A "legal entity" has a legal capacity to enter into agreements or contracts, assume obligations, incur and pay debts, sue and be sued in its own right, and be held responsible for its actions. A purchase order is a financial and legal contract between a buyer and a seller. A "sold-to legal entity" on a purchase order represents a buying entity associated with the purchase order who assumes any obligations originating from the purchase order, and who incurs and pays debts originating from the purchase order.

Procurement requirements around supplier management, and catalog management, are typically uniform across multiple lines of businesses within a certain geography, but requirements regarding assignment of the sold-to legal entity on a purchase order can vary from being a simple scenario to a highly complicated situation that involve buy/sell transactions in multiple subsidiaries before the purchase is expensed to the legal entity of the requesting department.

SUMMARY

One embodiment is a system that dynamically determines a sold-to legal entity associated with an electronic financial document. The system receives a request to generate the electronic financial document and qualifiers including attributes of the electronic financial document. The system further selects a supply chain financial orchestration flow based on programmable business rules and the qualifiers. The system further selects a sold-to legal entity that is defined by the selected supply chain financial orchestration flow. The system further generated the electronic financial document comprising the selected sold-to legal entity.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
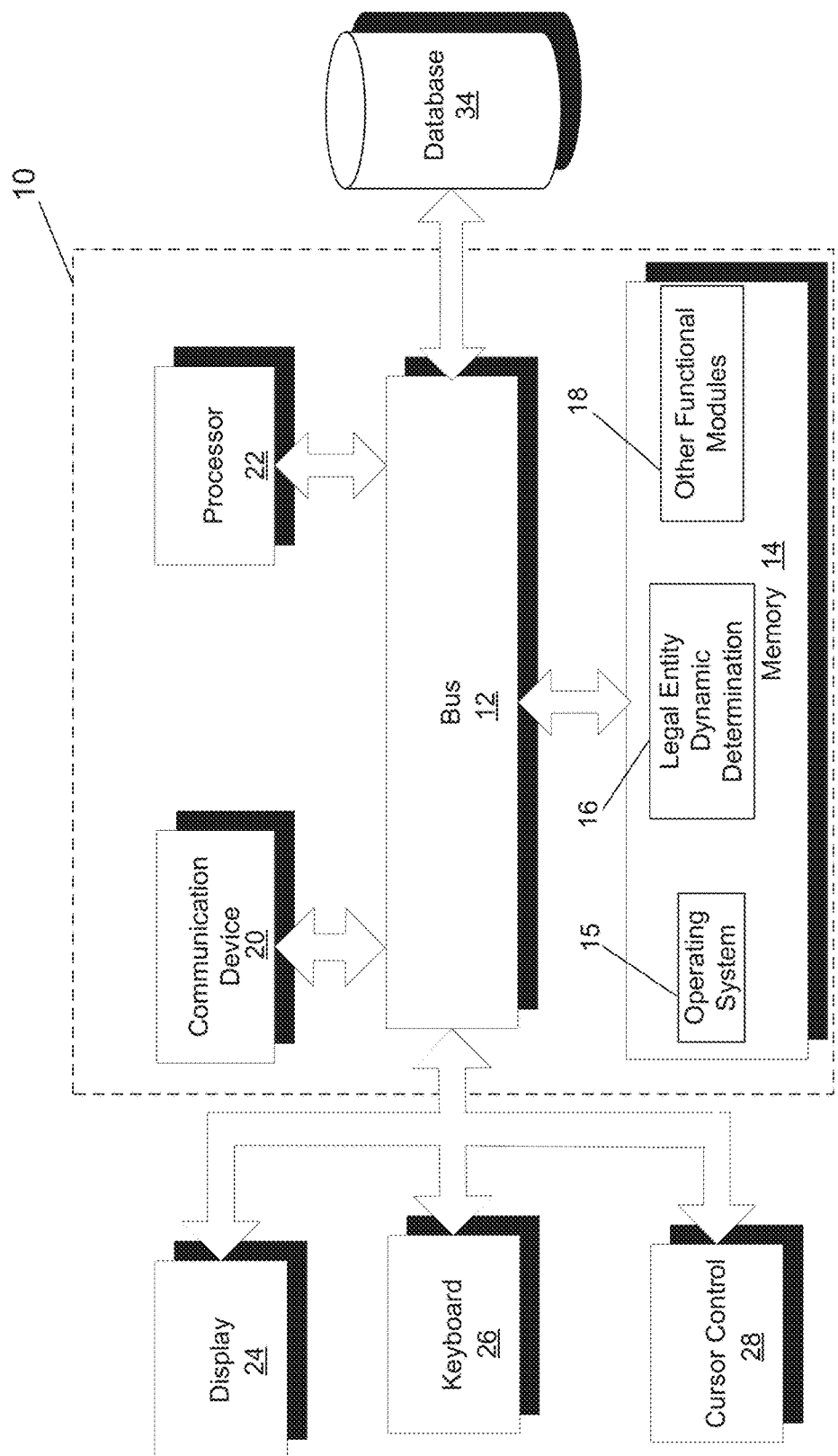
FIG. 1 illustrates a block diagram of a system that can implement an embodiment of the invention.

According to an embodiment, a purchasing system is provided that dynamically determines a sold-to legal entity associated with a financial document, such as a purchase order, where the financial document can be an electronic financial document that can be stored within an electronic format, such as a computer file, and that can be displayed within a user interface of the purchasing system. The purchasing system determines whether "supply chain financial orchestration" is enabled within the purchasing system, where "supply chain financial orchestration" is an orchestration of tasks associated with a "supply chain financial orchestration flow," and displays an indication as to whether financial orchestration is enabled within the user interface. The purchasing system further interfaces with a supply chain financial orchestration system that defines a "supply chain financial orchestration flow" for a supplier country. A "supply chain financial orchestration flow" defines a trade relationship between a first legal entity and a second legal entity. An example supply chain financial orchestration flow is disclosed in U.S. Pat. App. Pub. No. 2014/0095361. The purchasing system further defines whether the supply chain financial orchestration flow is eligible for implementation, and further displays the supply chain financial orchestration flow and an indication as to whether the supply chain financial orchestration flow is enabled within the user interface.

The purchasing system further facilitates the creation of a financial document, such as a purchase order, by allowing a user to enter attributes associated with the financial document, such as a profit center business unit of a ship-to organization, a supplier, a supplier site, and a ship-to location. The purchasing system further determines whether supply chain financial orchestration is enabled. If supply chain financial orchestration is enabled, the purchasing system further determines a ship-to inventory organization and associated profit center business unit of a ship-to organization specified by, or derived from, the attributes associated with financial document. The supply chain financial orchestration system further identifies an eligible supply chain financial orchestration flow by matching attributes associated with the financial document or attributes that are derived from attributes associated with the financial document, where the attributes can also be identified as "qualifiers." Such qualifiers can include a supplier, a supplier site, a supplier country, an asset item indicator, a purchasing category, or a profit center business unit of a ship-to organization. The supply chain financial orchestration system further returns a sold-to legal entity specified on the supply chain financial orchestration flow to the purchasing system, and the purchasing system further captures the returned sold-to legal entity on the financial document. The purchasing system further allows a privileged user to override the selection of the sold-to legal entity specified on the supply chain financial orchestration flow with a different sold-to legal entity.

FIG. 1 illustrates a block diagram of a system 10 that may implement one embodiment of the invention. In one embodiment, system 10 can be a specialized purchasing system. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a legal entity dynamic determination module 16, as well as other functional modules 18. Operating system 15 can provide an operating system functionality for system 10. Legal entity dynamic determination module 16 can provide functionality for dynamically determining a sold-to legal entity associated with a financial document, as is described in more detail below. In certain embodiments, legal entity dynamic determination module 16 can comprise a plurality of modules that each provide specific individual functionality for dynamically determining a sold-to legal entity associated with a financial document. System 10 can also be part of a larger system. Thus, system 10 can include one or more additional functional modules 18 to include the additional functionality. For example, functional modules 18 may include modules that provide additional functionality, such as an "Oracle Fusion Purchasing" product, from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
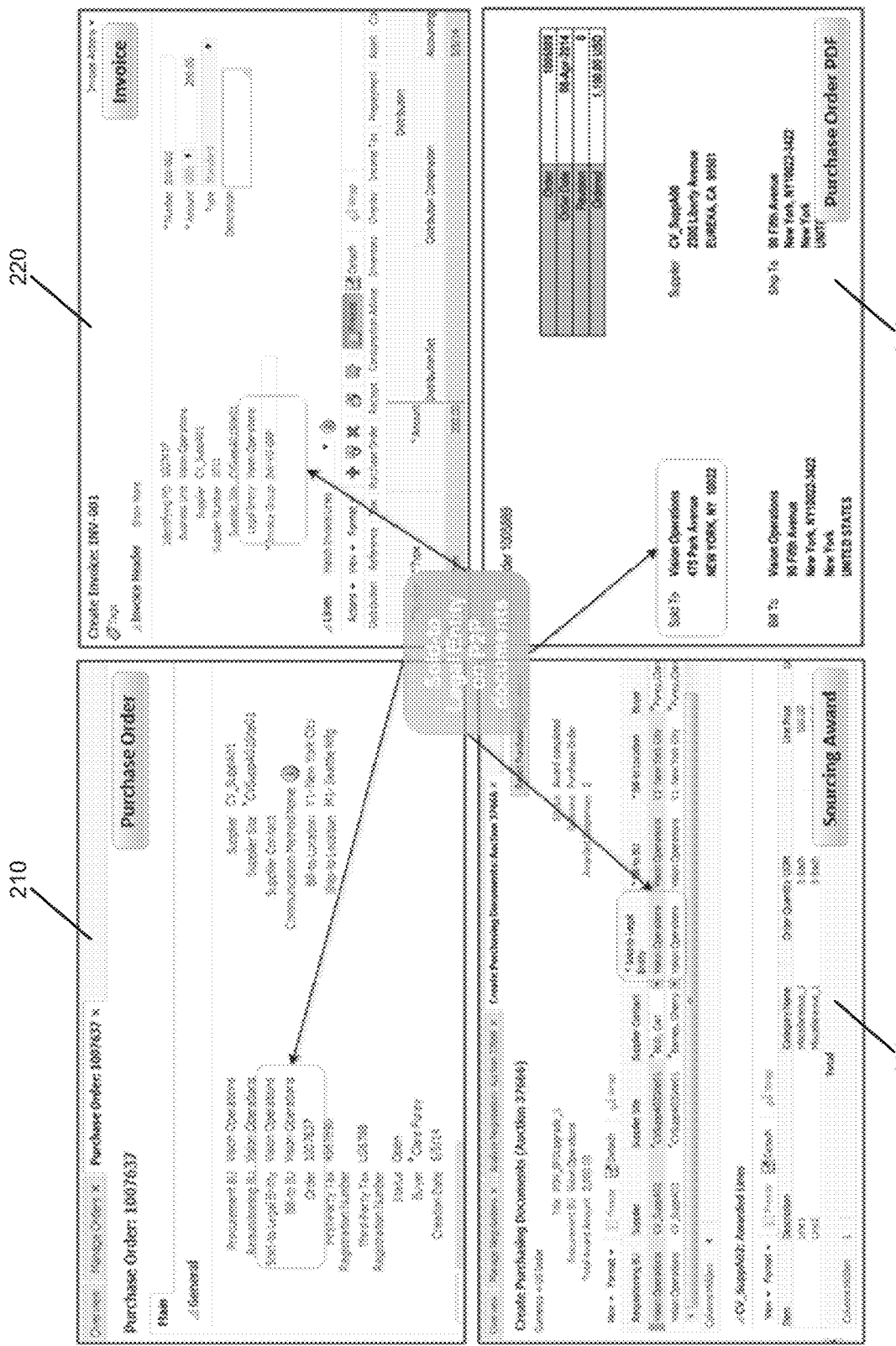
FIG. 2 illustrates a sold-to legal entity associated with a purchase order, sourcing award, and invoice, according to an embodiment of the invention.

FIG. 2 illustrates a sold-to legal entity associated with a purchase order, sourcing award, and invoice, according to an embodiment of the invention. As previously described, a "sold-to legal entity" is a legal entity that is liable for a purchase order, or other financial document, and has a relationship with a location of the supplier that is going to fulfill the purchase order. According to an embodiment, a purchasing system can capture a sold-to legal entity associated with a financial document, such as a purchase order, and display the sold-to legal entity within a user interface. The purchasing system can further display the sold-to legal entity as part of a display of the financial document, and can further print the sold-to legal entity as part of a printout of the financial document. According to the illustrated embodiment, FIG. 2 includes user interfaces 210, 220, 230, and 240. User interface 210 displays a purchase order and further displays a sold-to legal entity ("Vision Operations") associated with the purchase order. User interface 220 displays an invoice that is based on the purchase order displayed within user interface 210 and further displays the sold-to legal entity ("Vision Operations") associated with the invoice. User interface 230 displays a sourcing award that leads to the purchase order displayed within user interface 210 and further displays the sold-to legal entity ("Vision Operations") associated with the sourcing award. User interface 240 displays an electronic document representation, such as a Portable Document Format ("PDF") file representation, of the purchase order displayed within user interface 210, and further displays the sold-to legal entity ("Vision Operations") associated with the purchase order.

Figure 3:
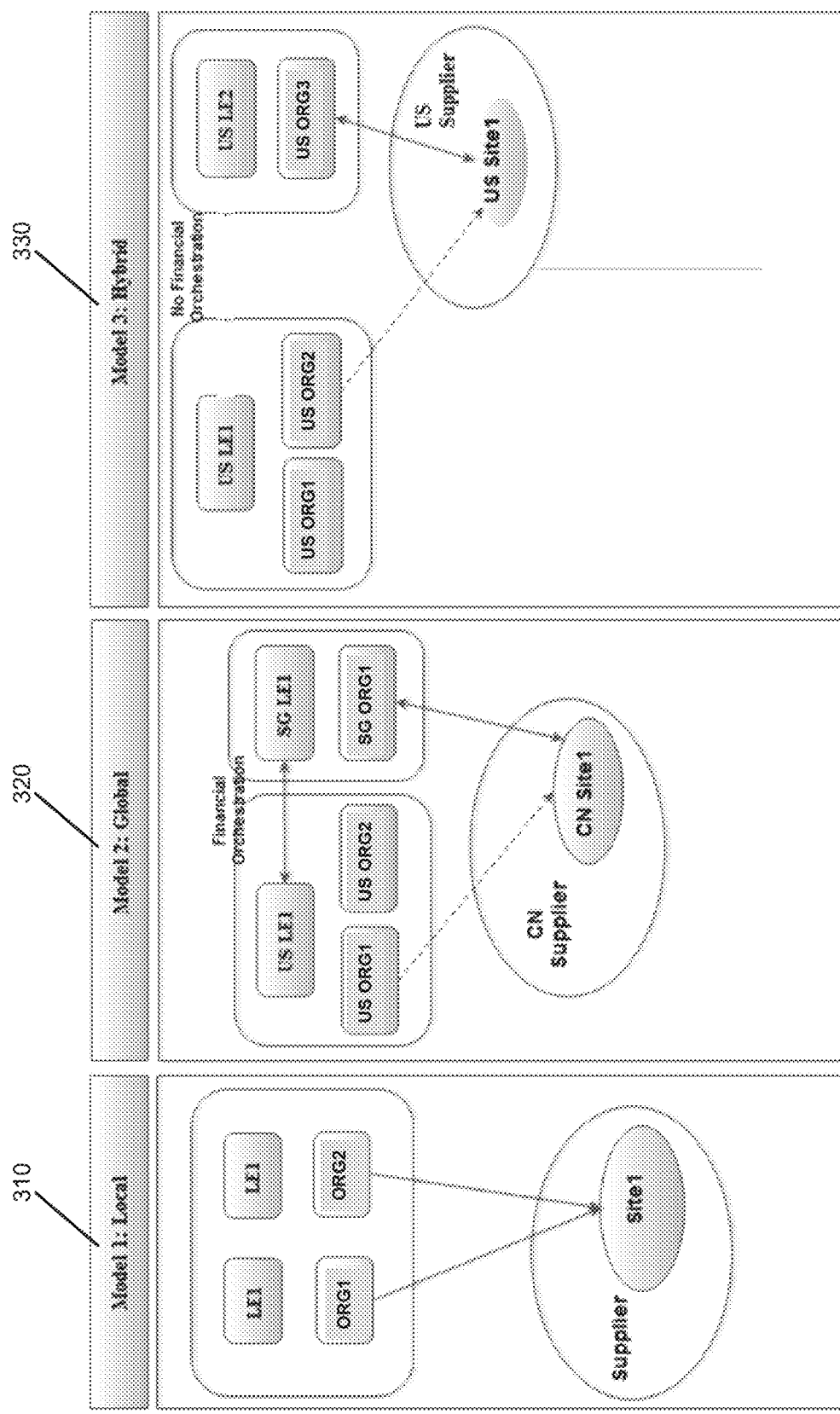
FIG. 3 illustrates procurement models according to an embodiment of the invention.

FIG. 3 illustrates procurement models 310, 320, and 330 according to an embodiment of the invention. Procurement model 310 is a local model. Within procurement model 310, organizations "ORG1" and "ORG2" belong to a legal entity "LE1." Purchase orders, or other financial documents, are created by organization "ORG1" or organization "ORG2" to a supplier site "Site1" of a supplier "Supplier." The purchase orders, or other financial documents, indicate legal entity "LE1" as a sold-to legal entity. In these scenarios, an organization is engaged with a local supplier, and organizational policies dictate that requisitions that are sourced from the local supplier be processed via purchase orders, where the sold-to legal entity is the legal entity that the line of business ("LOB"), department, cost center, or profit center reports into financially. It is this legal entity that possesses liability for the requested item or service. In procurement model 310, the sold-to legal entity is the legal entity of the organization requesting the item or service (i.e., the legal entity to which the ship-to organization specified on the purchase order, or other financial document, rolls up to). In other words, in procurement model 310, the sold-to legal entity is legal entity "LE1." In the illustrated embodiment, within procurement model 310, a purchase order is associated with a supplier site "Site1" of a supplier "Supplier." The requesting organization is either "ORG1" or "ORG2." The sold-to legal entity is legal entity "LE1." Further, the ship-to organization is either organization "ORG1" or "ORG2."

Procurement model 320 is a global model. Within procurement model 320, organizations "US ORG1" and "US ORG2" roll up to legal entity "US LE1". Further, within procurement model 320, organization "SG ORG1" rolls up to legal entity "SG LE1." Purchase orders, or other financial documents, that are created to fulfill requirements from organization "US ORG1" or organization "US ORG2" are generated for a sold-to legal entity "SG LE1," which is the legal entity of the organization "SG ORG1." Thus, in scenarios where organization "US ORG1" or organization "US ORG2" is the requesting organization, the sold-to legal entity is not legal entity "US LE1," and thus, the liability is not assumed by legal entity "US LE1." Instead, the sold-to legal entity is "SG LE1," and thus, the liability is assumed by legal entity "SG LE1." In such scenarios, a requesting organization typically does not have any direct relationship with the supplier site fulfilling the order. Instead, it is a subsidiary that manages, or otherwise engages in a relationship with, the supplier site. In the illustrated embodiment, within procurement model 320, a purchase order is associated with a supplier site "CN Site1" of a supplier "CN Supplier." The requesting organization is "US ORG1." However, the sold-to legal entity is legal entity "SG LE1," rather than "US LE 1." The ship-to organization is organization "US ORG1." Upon receipt into "US ORG1," "SG LE1" sells the procured goods to "US LE1."

Procurement model 320 is typically seen in organizations that have built sophisticated supply chains, in which they engage with suppliers all across the world. Procurement model 320 is popular with such organizations because China and Southeast Asian countries have become the manufacturing hub of the world, and an increasing number of companies around the world are outsourcing low-end tasks to low-cost countries. Procurement model 320 is also popular with global corporations that direct their overseas income to low-tax countries to minimize tax expenses. Such companies requires purchases to be financially orchestrated via one or more supply chain financial orchestration flows across multiple legal entities, and, in the process, reap tax efficiencies. In order to orchestrate such a flow, one or more transfer pricing arrangements are agreed upon among various legal entities involved in a transaction.

Procurement model 330 is a local-global hybrid model. Within procurement model 330, organizations "US ORG1" and "US ORG2" roll up to legal entity "US LE1." Further, within procurement model 330, organization "US ORG3" rolls up to legal entity "US LE2." In the illustrated embodiment, within procurement model 330, a purchase order is associated with a supplier site "US Site1" of a supplier "US Supplier." The requesting organization is "US ORG2." However, the sold-to legal entity is legal entity "US LE2," rather than legal entity "US LE1." Further, the ship-to organization is organization "US ORG3" rather than organization "US ORG2." In countries like the United States, regulations allow a legal entity to procure goods and services on behalf of another legal entity without a formal trade agreement, such as a supply chain financial orchestration flow, or without any additional legal documentation, such as an intercompany accounts receivable invoice and an intercompany accounts payable invoice. Intercompany journal entries can be created in a general ledger once the transaction is accrued.

In order to support the three models, global companies have setup subsidiaries (registered as legal entities) at various locations to work with suppliers. A given subsidiary or legal entity can be designated to issue purchase orders, or other financial documents, based on several factors, such as: the location where goods/services are being delivered; the location of the entity from where the goods/services are being sourced; the category of the goods/services being procured; the nature of the usage of the goods/services; legal considerations of the transactions, given the jurisdictions involved in the source and destination locations and the physical path that the goods/services will traverse; and tax advantages of buying the goods/services directly versus through a subsidiary.

There can be several documents that are required to be created in order to enable such a transaction. These documents can include: a trade agreement that is an agreement between the requesting organization and the fulfilling organization stating the price that the subsidiary will charge for the service provided and indicating one or more legal entities through which the financial transaction will flow; and an intercompany invoice, such as an intercompany accounts receivable invoice and intercompany accounts payable invoice, to record the buy and sell transactions between the two organizations.

Prior purchasing systems typically do not fully address all the requirements that customers face to support all three purchasing models. Certain prior purchasing systems provide customers the ability to specify a sold-to party for each requesting business unit and supplier site combination. This control is usually inadequate to meet customer needs, and can force customers to engage in unnecessary and consuming setups. An example is further described below in greater detail in conjunction with FIG. 5.

Further, a determination of a sold-to legal entity can depend on many factors. There can be certain scenarios in which all the information is not known upfront. This could lead a supply chain financial orchestration system to recommend a sub-optimal supply chain financial orchestration flow, and correspondingly, a sub-optimal sold-to legal entity. Thus, an organization may require a privileged user to override a sold-to legal entity recommended by the supply chain financial orchestration system.

For example, a user of a purchasing system can create a purchase order but not provide any information upfront regarding an item that the user is procuring. It is possible that there exists a supply chain financial orchestration flow within a supply chain financial orchestration system for the item that the user is procuring. The supply chain financial orchestration system may recommend a legal entity as the sold-to legal entity, where the legal entity is different from the legal entity that is authorized to procure the item. In this situation, a privileged user should have the capability to override the sold-to legal entity.

Prior purchasing systems typically determine a sold-to legal entity solely based on a profit center business unit of a ship-to organization and a supplier site specified on a purchase order, or other financial document. However, customers may need a broad range of attributes that they could leverage in determining a supply chain financial orchestration flow to be utilized to determine a sold-to legal entity. Customers may also want to create multiple supply chain financial orchestration flows and qualify them to be used for certain types of transactions. For example, if a profit center business unit of a ship-to organization is in the United States (e.g., "Vision Operations"), and a supplier's country is in Netherlands, then a customer may wish to select a supply chain financial orchestration flow identified as "123" and a corresponding sold-to legal entity (e.g., "Vision Netherlands"). As another example, if profit center business unit of a ship-to organization is "Vision Operations," and an asset class item is being purchased, or the item has a category of "Heavy Industrial Equipment," then the customer may wish to select a supply chain financial orchestration flow identified as "789" and a corresponding legal entity (e.g., "Vision Germany"). Other attributes that a customer may want to use to determine a supply chain financial orchestration flow can include a ship-to organization and destination type. Thus, according to an embodiment, a supply chain financial orchestration system can select a supply chain financial orchestration flow, and thus, a corresponding sold-to legal entity, for a purchase order, or other financial document, based on one or more attributes of the purchase order or one or more attributes that are derived from one or more attributes of the purchase order, where the one or more attributes can also be identified as "qualifiers."

According to an embodiment, a supply chain financial orchestration system can further provide an additional layer of flexibility to customers by allowing users to set a priority on a supply chain financial orchestration flow. For example, there can exist a supply chain financial orchestration flow "A123" that is defined to be used when procuring an item "I123." There can also exist a supply chain financial orchestration flow "A789" that is defined to be used when goods are shipped from a specific country, such as Germany. If a purchase order is created for item "I123," and the supplier site selected is in Germany, the supply chain financial orchestration system can determine whether to select supply chain financial orchestration flow "A123" or supply chain financial orchestration flow "A789" based on priorities defined for the two supply chain financial orchestration flows.

As previously described, typically, the determination of a sold-to legal entity in prior purchasing systems was solely based on a profit center business unit of a ship-to organization and a supplier site specified on a purchase order, or other type of financial document. This meant that even if a single supply chain financial orchestration flow was sufficient for all supplier sites within a country, the information needed to be replicated for each combination of profit center business unit of a ship-to organization and supplier site. In accordance with an embodiment, a supply chain financial orchestration system can eliminate this requirement, since an eligibility condition for a supply chain financial orchestration flow can be defined using a supplier country. A requisitioning business unit may also be managing multiple organizations that rollup to different profit center business units. A supply chain orchestration flow is between a profit center business unit of a ship-to organization and a profit center business unit of a trade organization. In those cases, where there are multiple profit center business units managed by a requisitioning business unit, prior purchasing systems typically do not let a user setup a specialized supply chain orchestration flow for one of the multiple profit center business units managed by the requisitioning business unit. This may force customers to create more requisitioning business units than they actually need.

Further, a prior purchasing system typically did not provide any capability to override the sold-to legal entity determined by a supply chain financial orchestration system. In accordance with an embodiment, a purchasing system provides, to a privileged user, a capability to override a sold-to legal entity selected by the purchasing system.

Figure 4:
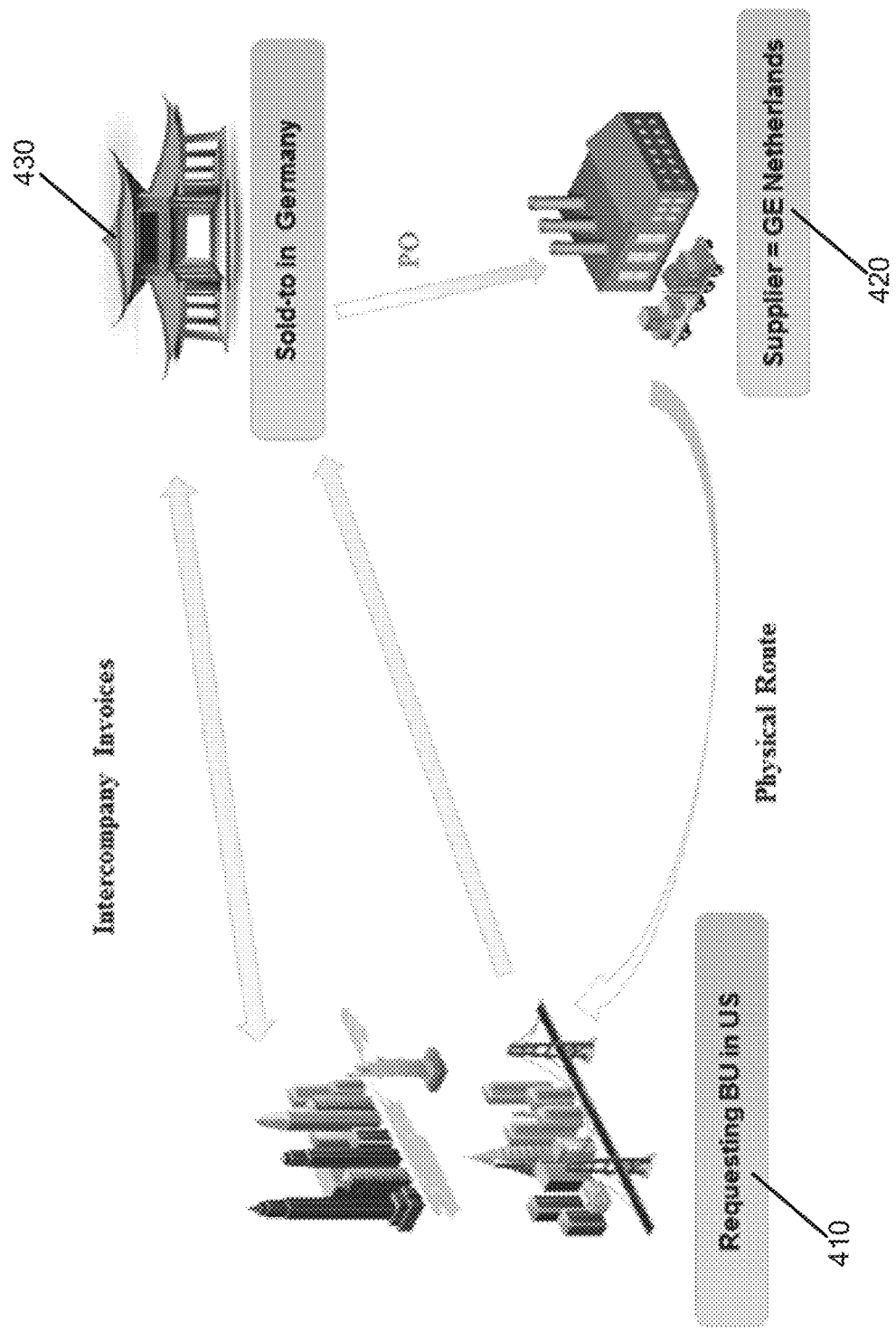
FIG. 4 illustrates an example transaction according to a global procurement model, according to an embodiment of the invention.

FIG. 4 illustrates an example transaction according to a global procurement model, according to an embodiment of the invention. The transaction involves a profit center business unit of a ship-to organization in the United States, profit center business unit 410. Profit center business unit 410 wishes to procure an item from a supplier in Germany, supplier 420 (i.e., "GE Netherlands"). Profit center business unit 410 is part of a U.S. legal entity that has a subsidiary in Germany, sold-to legal entity 430. Sold-to legal entity 430 has a relationship with supplier 420, and sold-to legal entity 430 can provide procurement services to the U.S. legal entity for profit center business unit 410. Thus, in accordance with an embodiment, a purchasing system can generate a purchase order, or other financial document, where a profit center business unit of a ship-to organization associated with the purchase order is profit center business unit 410, and where a sold-to legal entity associated with the purchase order is sold-to legal entity 430.

Figure 5:
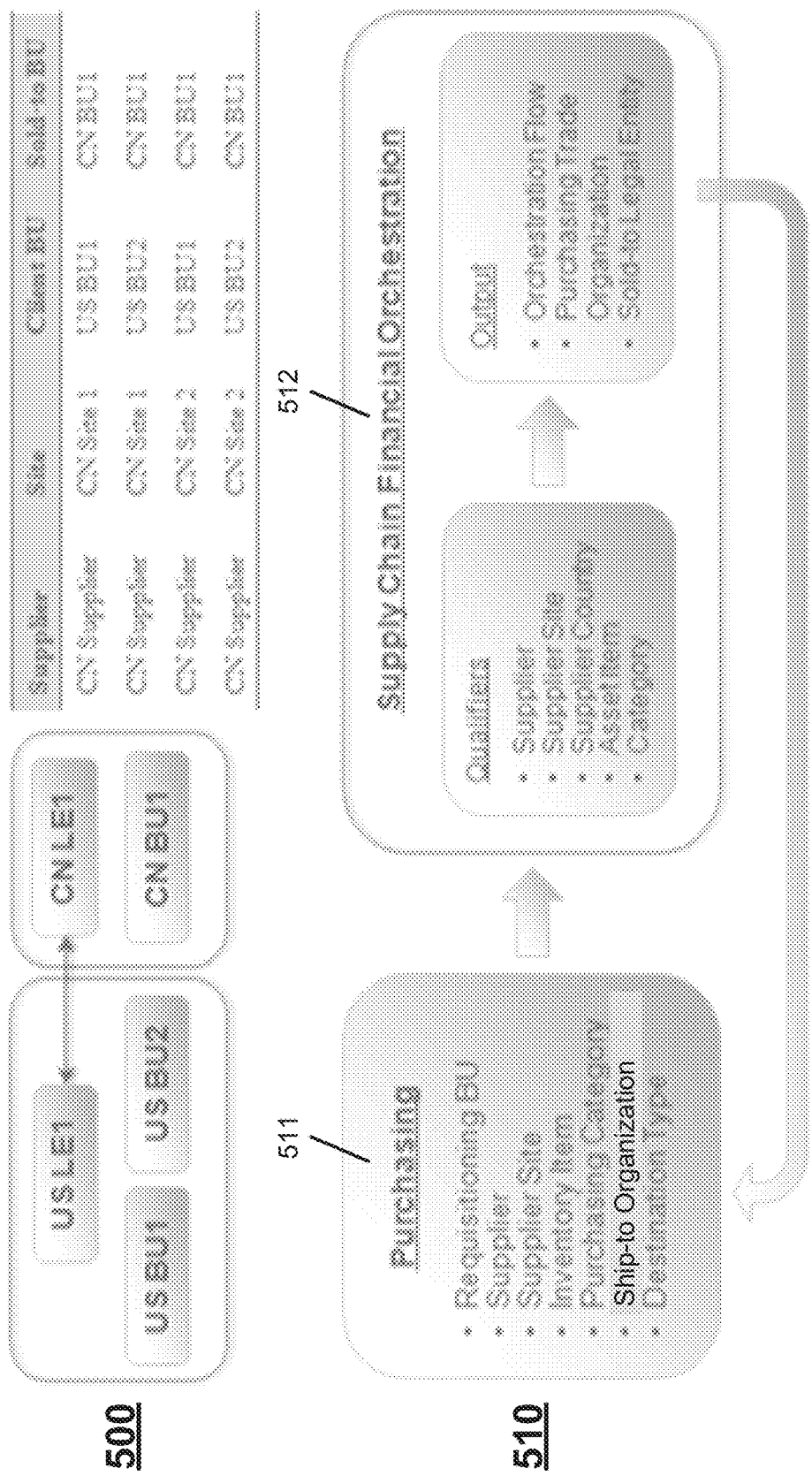
FIG. 5 illustrates a dynamic determination of a sold-to legal entity by selecting a supply chain financial orchestration flow based on qualifiers, as compared to a manual determination of a sold-to legal entity in prior purchasing systems, according to an embodiment of the invention.

FIG. 5 illustrates a dynamic determination of a sold-to legal entity by selecting a supply chain financial orchestration flow based on qualifiers (i.e., dynamic determination 510), as compared to a determination of a sold-to legal entity in prior purchasing systems requiring setup steps (i.e., setup determination 500), according to an embodiment of the invention. As previously described, prior purchasing systems can require customers to specify a sold-to party for each requesting business unit and supplier site combination. This can result in a determination of a sold-to legal entity based on one or more setups, such as setup determination 500. Within setup determination 500, a legal entity in the United States, legal entity "US LE1", has two business units, business units "US BU1" and "US BU2." Further, a legal entity in China, legal entity "CN LE1," has a business unit, business unit "CN BU1." Business units "US BU1" and "US BU2" do business with two supplier sites in China, supplier site "CN Site 1" and supplier site "CN Site 2," where supplier sites "CN Site 1" and "CN Site 2" are supplier sites for the supplier, "CN Supplier." Organizations can require that if the country of the supplier site is China, then a sold-to legal entity on a purchase order, or other financial document, should be legal entity "CN LE1." Certain prior purchasing systems lacked the capacity to create a rule defining a sold-to legal entity as legal entity "CN LE1." Instead, the prior purchasing systems typically forced customers to create four setup records: one for each combination of requisitioning business units (i.e., business units "US BU1" and "US BU2"), and for each combination of supplier sites (i.e., supplier sites "CN Site 1" and "CN Site 2"). Customers were required to create these setup records, even though the sold-to legal entity for each setup record was legal entity "CN LE1." This led to unnecessary setups that were frustrating to customers.

In accordance with an embodiment, a purchasing system 511 can interface with a supply chain financial orchestration system 512 in order to implement a dynamic determination of a sold-to legal entity, such as dynamic determination 510. A supply chain financial orchestration system, such as supply chain financial orchestration system 512, is a computer system that can generate and store supply chain financial orchestration flows. According to the embodiment, once a purchase order, or other financial document, is generated within purchasing system 511, purchasing system 511 can transmit one or more attributes of the purchase order or one or more attributes that are derived from one or more attributes of the purchase order (where such attributes or derived attributes are identified as "qualifiers") to supply chain financial orchestration system 512. Such qualifiers can include a supplier, a supplier site, a supplier country, an asset item indicator, a purchasing category, or a profit center business unit of a ship-to organization. Supply chain financial orchestration system 512 can dynamically analyze the qualifiers and dynamically select a supply chain financial orchestration flow based on the analyzed qualifiers. More specifically, supply chain financial orchestration system 512 can dynamically match one or more of the analyzed qualifiers with one or more qualifiers of a supply chain financial orchestration flow, and can dynamically select the supply chain financial orchestration flow. In one embodiment, supply chain financial orchestration system 512 can dynamically select the supply chain financial orchestration flow that has the largest number of qualifiers that match the analyzed qualifiers. Supply chain financial orchestration system 512 can further dynamically select a sold-to legal entity based on the dynamically selected supply chain financial orchestration flow. Dynamic determination 510 is further described below in greater detail in conjunction with FIG. 20.

Figure 6:
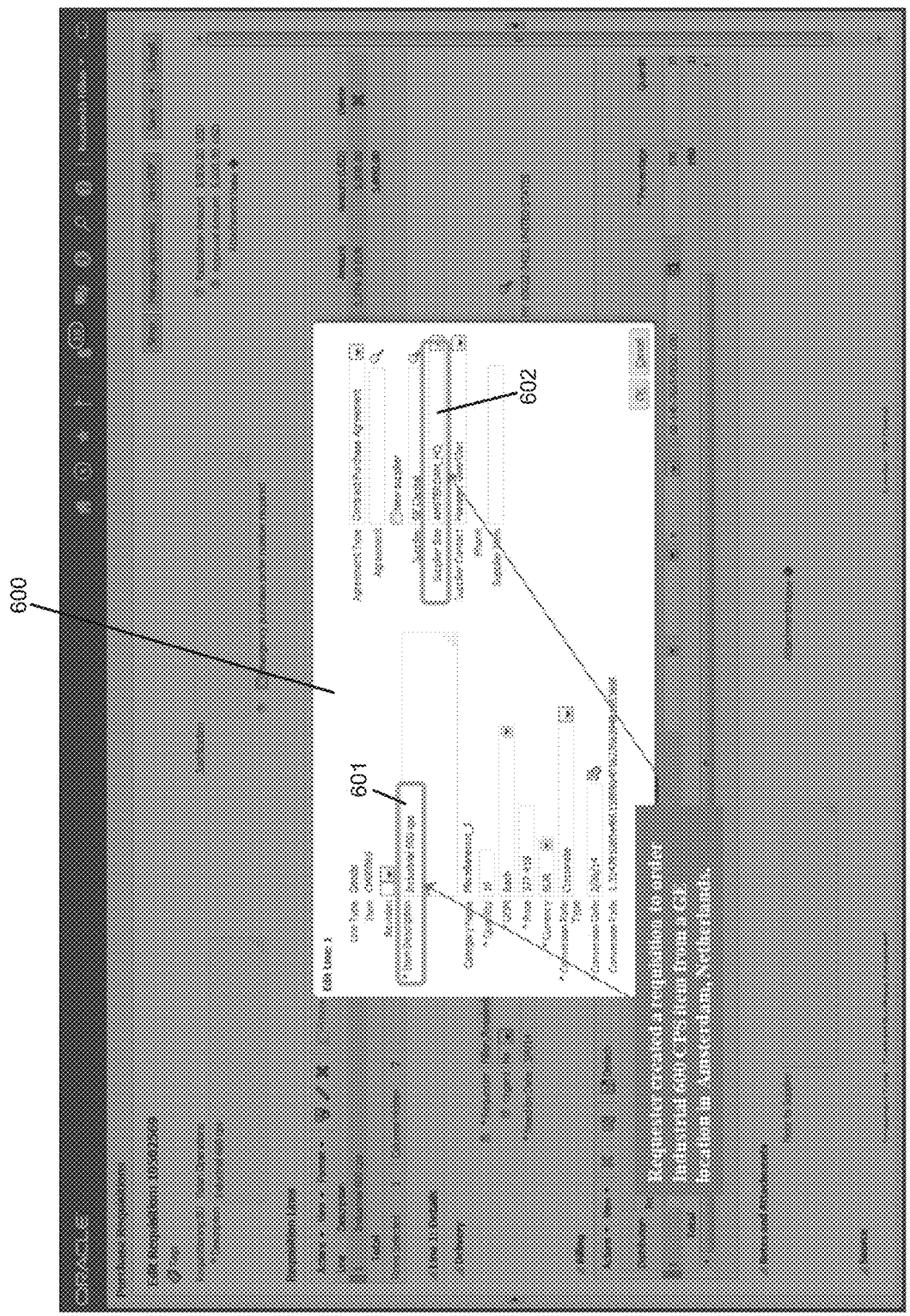
FIG. 6 illustrates an example user interface of a purchasing system that is used to create a requisition, according to an embodiment of the invention.

FIG. 6 illustrates an example user interface 600 of a purchasing system that is used to create a requisition, according to an embodiment of the invention. User interface 600 displays one or more fields where a user can enter values within the one or more fields. Within user interface 600, a user enters a value of "Industrial 600 CPS" within an item description field 601. "Industrial 600 CPS" describes the item that the user wishes to procure. Further, within user interface 600, a user enters a value of "AMSTERDAM_HQ" within supplier site field 602 of user interface 600. "AMSTERDAM_HQ" identifies a supplier that the user wishes to procure from.

Figure 7:
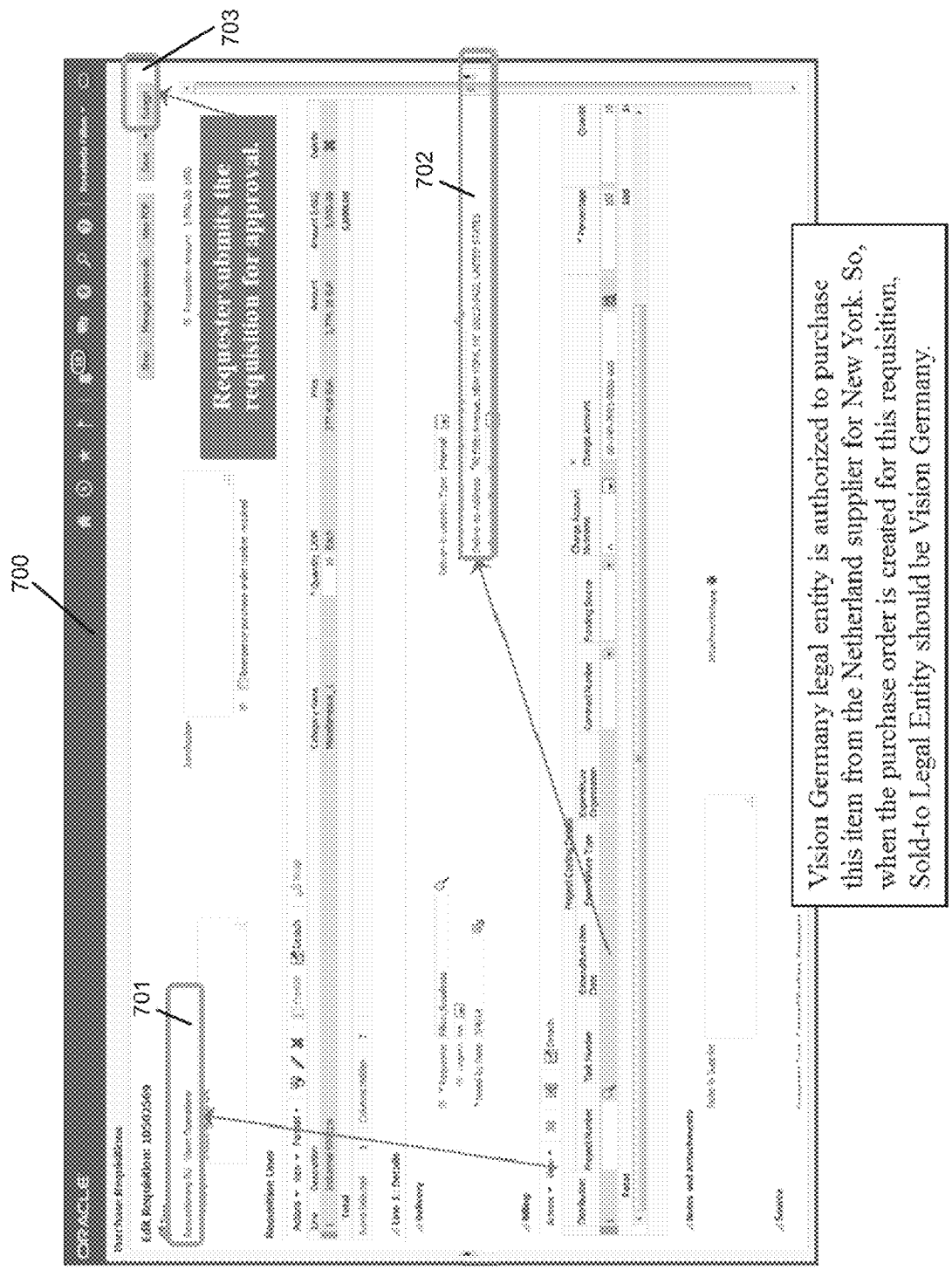
FIG. 7 illustrates another example user interface of a purchasing system that is used to create a requisition, according to an embodiment of the invention.

FIG. 7 illustrates an example user interface 700 of a purchasing system that is used to create a requisition, according to an embodiment of the invention. User interface 700 displays one or more attributes of the requisition that the user is creating, where the one or more attributes are displayed within one or more fields. User interface 700 further allows the user to edit the requisition before submitting the requisition for processing. User interface 700 displays a profit center business unit field 701, which indicates a profit center business unit of a ship-to organization. In the illustrated embodiment, profit center business unit field 701 displays a value of "Vision Operations." In one embodiment, a user can enter the value "Vision Operations" within profit center business unit field 701. User interface 700 further displays a deliver-to address field 702. In the illustrated embodiment, deliver-to address field 702 displays a value of "90 Fifth Avenue, NEW YORK, N.Y. 10022-3422, UNITED STATES." In one embodiment, a user can enter the value "90 Fifth Avenue, NEW YORK, N.Y. 10022-3422, UNITED STATES" within deliver-to address field 702. The user can then click on, or otherwise interact with, submit button 703 to submit the requisition, and the purchasing system can process the requisition.

Figure 8:
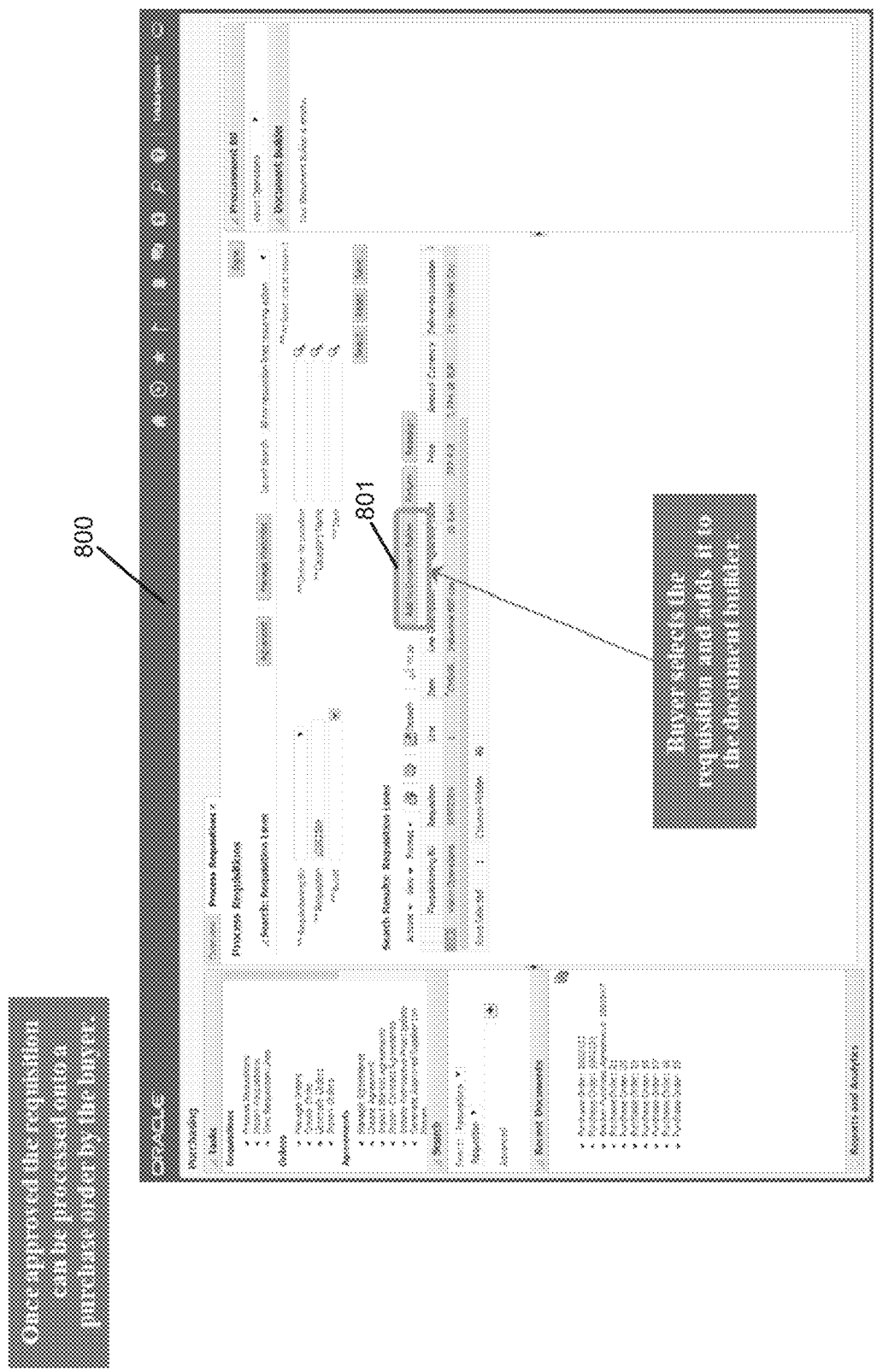
FIG. 8 illustrates a user interface of a purchasing system that is used to process a requisition onto a purchase order, according to an embodiment of the invention.

FIG. 8 illustrates a user interface 800 of a purchasing system that is used to process a requisition onto a purchase order, according to an embodiment of the invention. According to the embodiment, user interface 800 displays the requisition created by a user using user interface 700 of FIG. 7. The user can select the displayed requisition and click on, or otherwise interact with, add to document builder button 801 to add the selected requisition to a document builder, where the document builder is a module of the purchasing system used to generate a purchase order.

Figure 9:
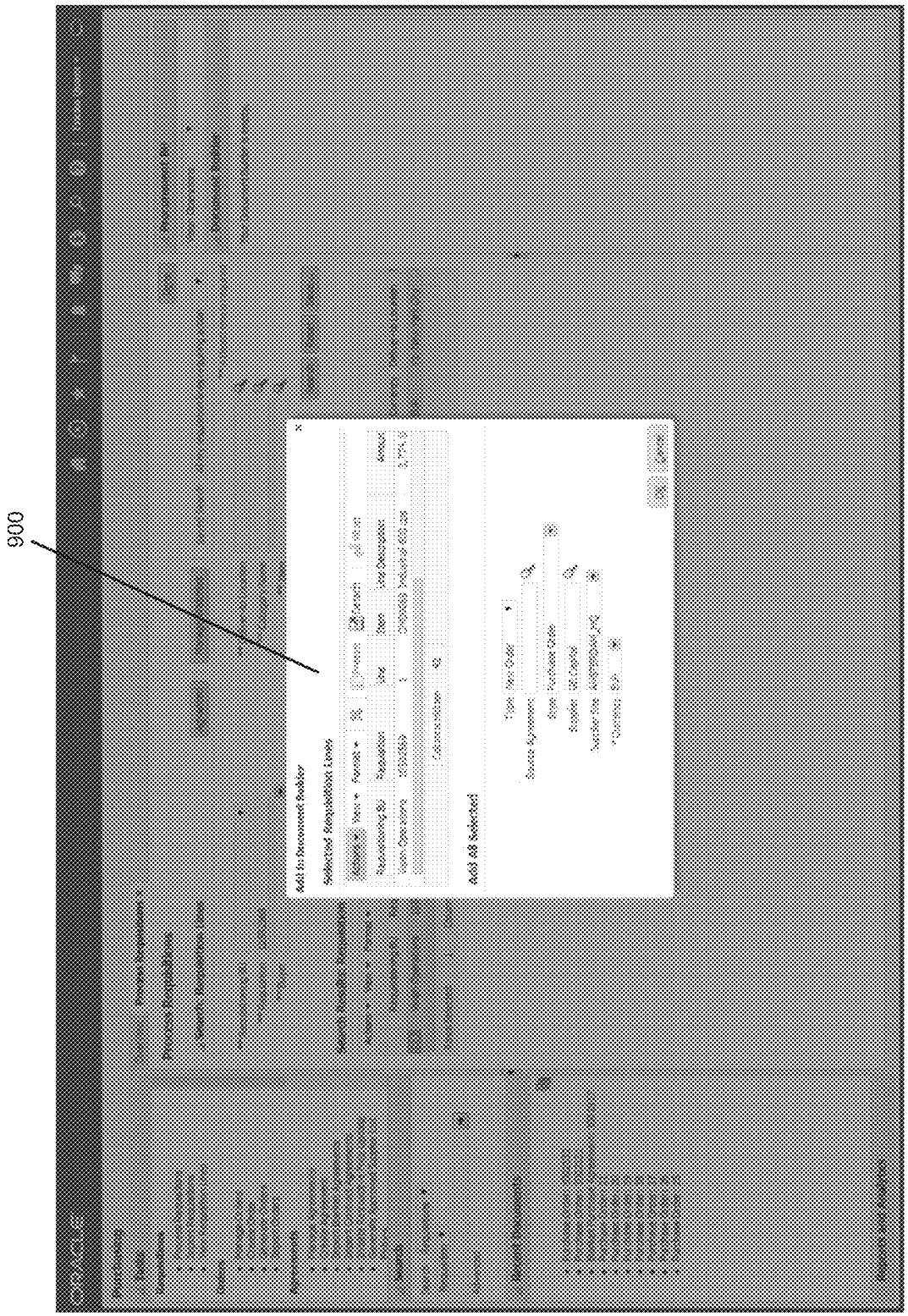
FIG. 9 illustrates another user interface of a purchasing system that is used to process a requisition onto a purchase order, according to an embodiment of the invention.

FIG. 9 illustrates a user interface 900 of a purchasing system that is used to process a requisition onto a purchase order, according to an embodiment of the invention. According to the embodiment, user interface 900 displays one or more requisition lines. In an embodiment, user interface 900 can display one or more requisition lines that satisfy a query criteria, where the query criteria is determined based on the requisition displayed within user interface 800 of FIG. 8. The user can confirm the selection of the requisition lines, and the requisition lines can be added to the document builder.

Figure 10:
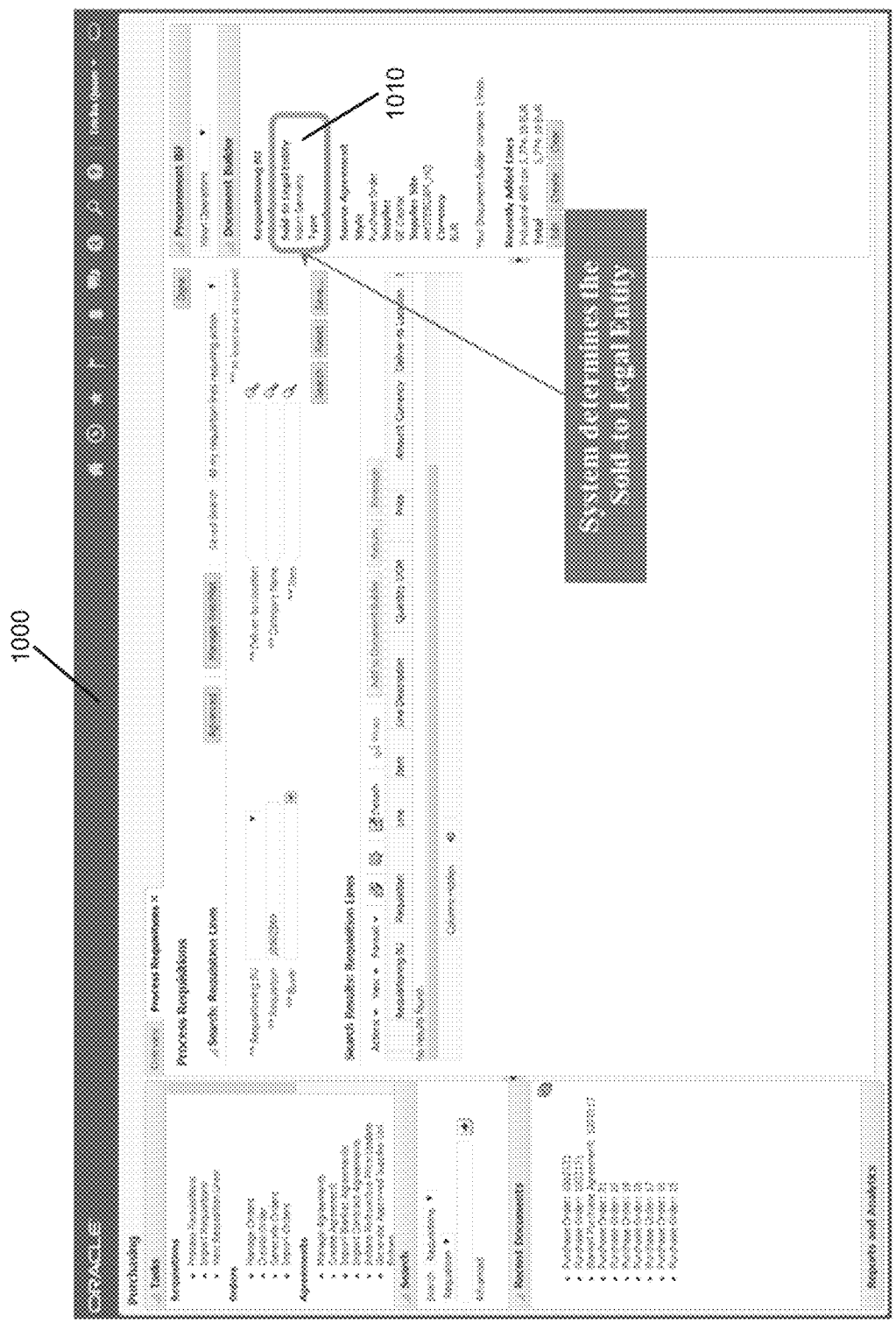
FIG. 10 illustrates a user interface of a purchasing system that displays a sold-to legal entity, where the sold-to legal entity is dynamically determined by the purchasing system, according to an embodiment of the invention.

FIG. 10 illustrates a user interface 1000 of a purchasing system that displays a sold-to legal entity 1010, where sold-to legal entity 1010 is dynamically determined by the purchasing system, according to an embodiment of the invention. According to the illustrated embodiment, the purchasing system dynamically determines that sold-to legal entity 1010 is "Vision Germany." In accordance with the embodiment, a supply chain financial orchestration system dynamically selects a supply chain financial orchestration flow based on one or more qualifiers of the purchase order, and dynamically selects a sold-to legal entity based on the dynamically selected supply chain financial orchestration flow. Specifics of the dynamic determination of sold-to legal entity 1010 are further described below in greater detail in conjunction with FIGS. 11-16.

Figure 11:
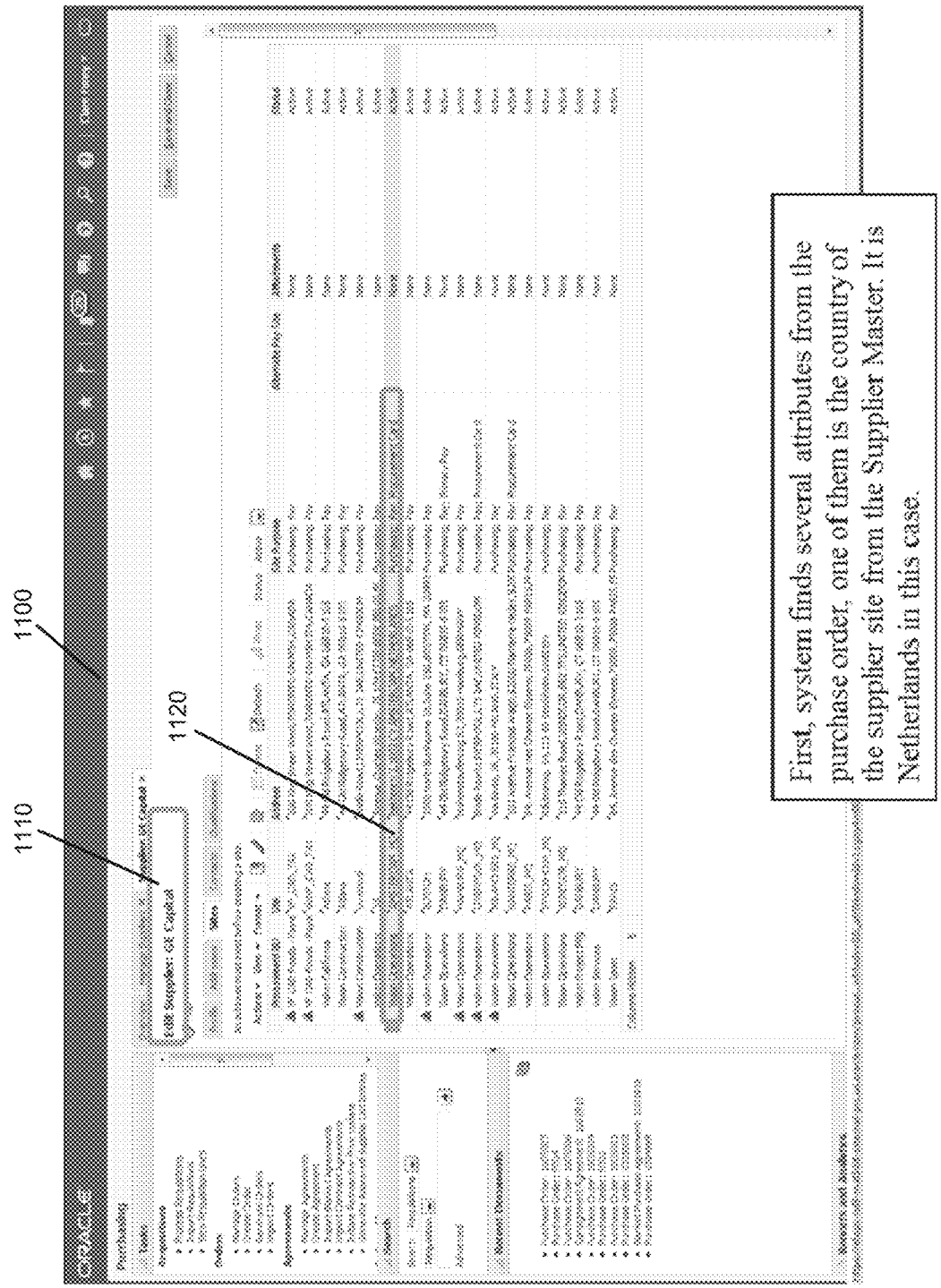
FIG. 11 illustrates a user interface of a purchasing system that displays a supplier country associated with a purchase order, according to an embodiment of the invention.

FIG. 11 illustrates a user interface 1100 of a purchasing system that displays a supplier country associated with a purchase order, according to an embodiment of the invention. The purchasing system analyzes one or more attributes associated with the purchase order. In accordance with an embodiment of the invention, the attributes include a supplier and a supplier site. In the illustrated embodiment, a supplier 1110 is "GE Capital," and a supplier site 1120 is "AMSTERDAM_HQ." From the supplier and the supplier site, the purchasing system can derive a supplier country. In the illustrated the supplier country is "Netherlands."

Figure 12:
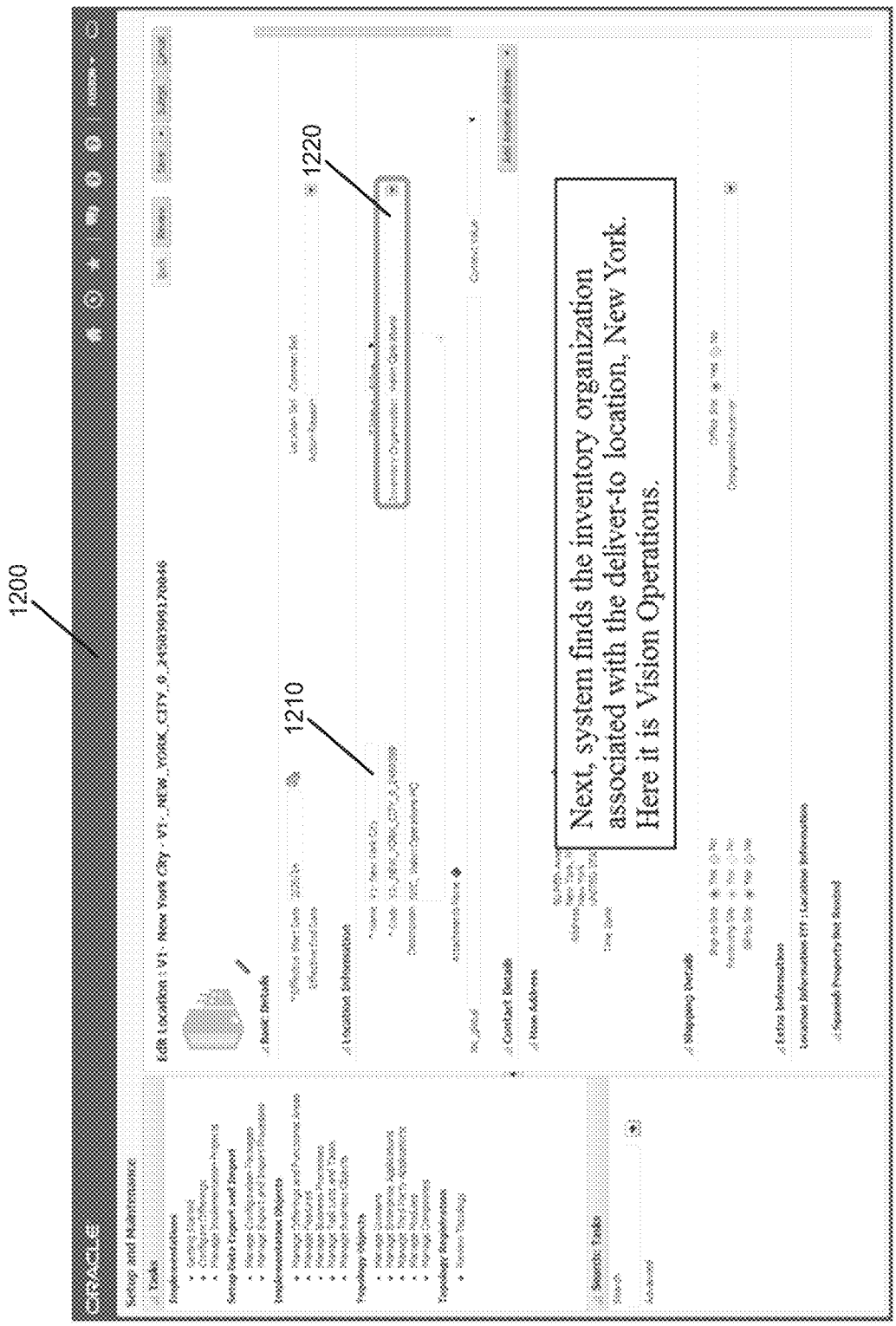
FIG. 12 illustrates a user interface of a purchasing system that displays an inventory organization associated with a deliver-to location of a purchase order, according to an embodiment of the invention.

FIG. 12 illustrates a user interface 1200 of a purchasing system that displays an inventory organization associated with a deliver-to location of a purchase order, according to an embodiment of the invention. The purchasing system further analyzes one or more attributes associated with the purchasing order. In accordance with an embodiment of the invention, the attributes include a deliver-to location. In the illustrated embodiment, a deliver-to location 1210 is "New York." From the deliver-to location, the purchasing system can derive an inventory organization. In the illustrated embodiment, an inventory organization 1220 is "Vision Operations."

Figure 13:
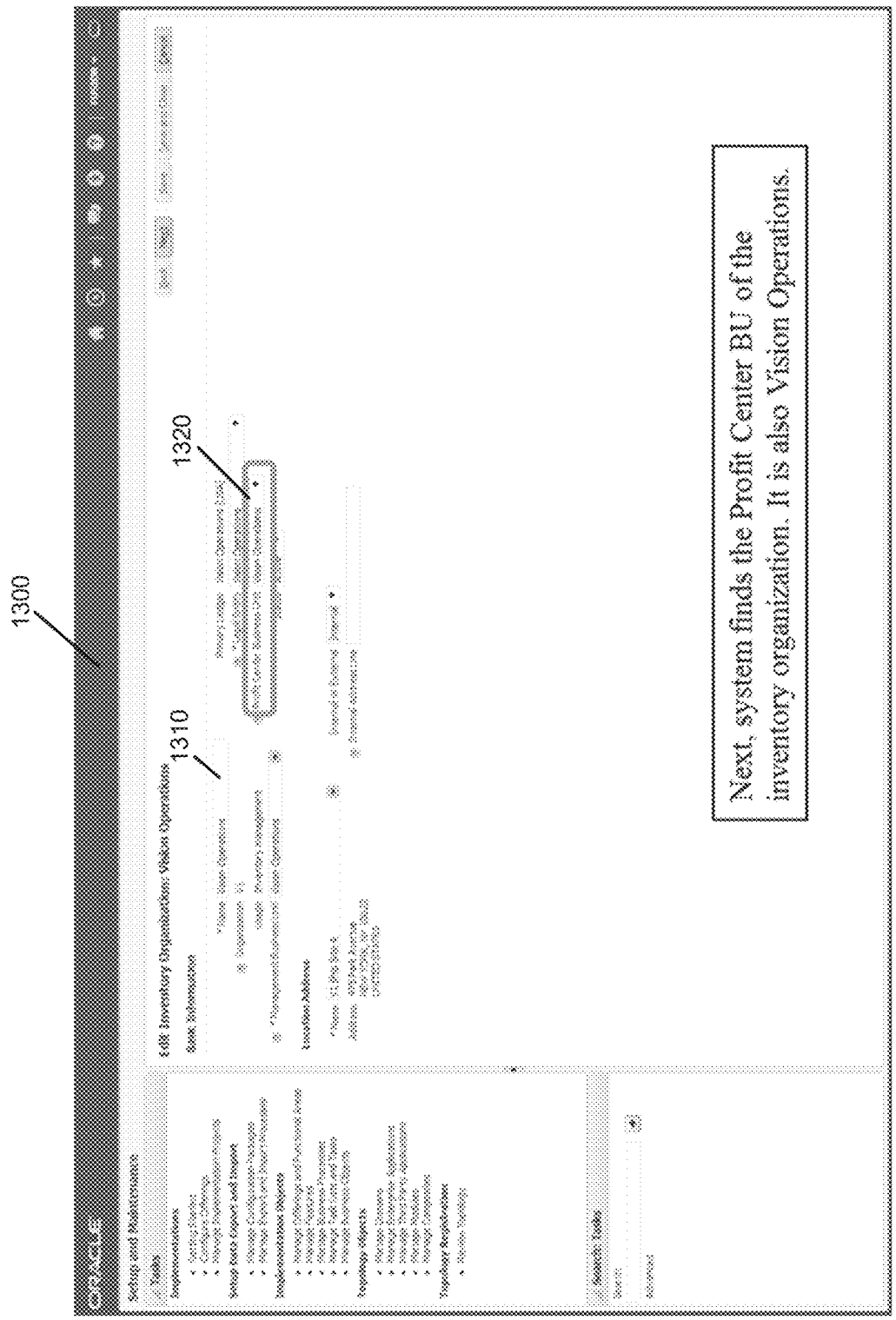
FIG. 13 illustrates a user interface of a purchasing system that displays a profit center business unit of a ship-to organization associated with an inventory organization of a purchase order, according to an embodiment of the invention.

FIG. 13 illustrates a user interface 1300 of a purchasing system that displays a profit center business unit of a ship-to organization associated with an inventory organization of a purchase order according to an embodiment of the invention. As previously described, the purchasing system can derive an inventory organization based on one or more attributes associated with the purchasing order. In the illustrated embodiment, an inventory organization 1310 is "Vision Operations." From the inventory organization, the purchasing system can derive a profit center business unit of a ship-to organization. In the illustrated embodiment, a profit center business unit 1320 (where profit center business unit 1320 is a profit center business unit of a ship-to organization) is "Vision Operations."

Figure 14:
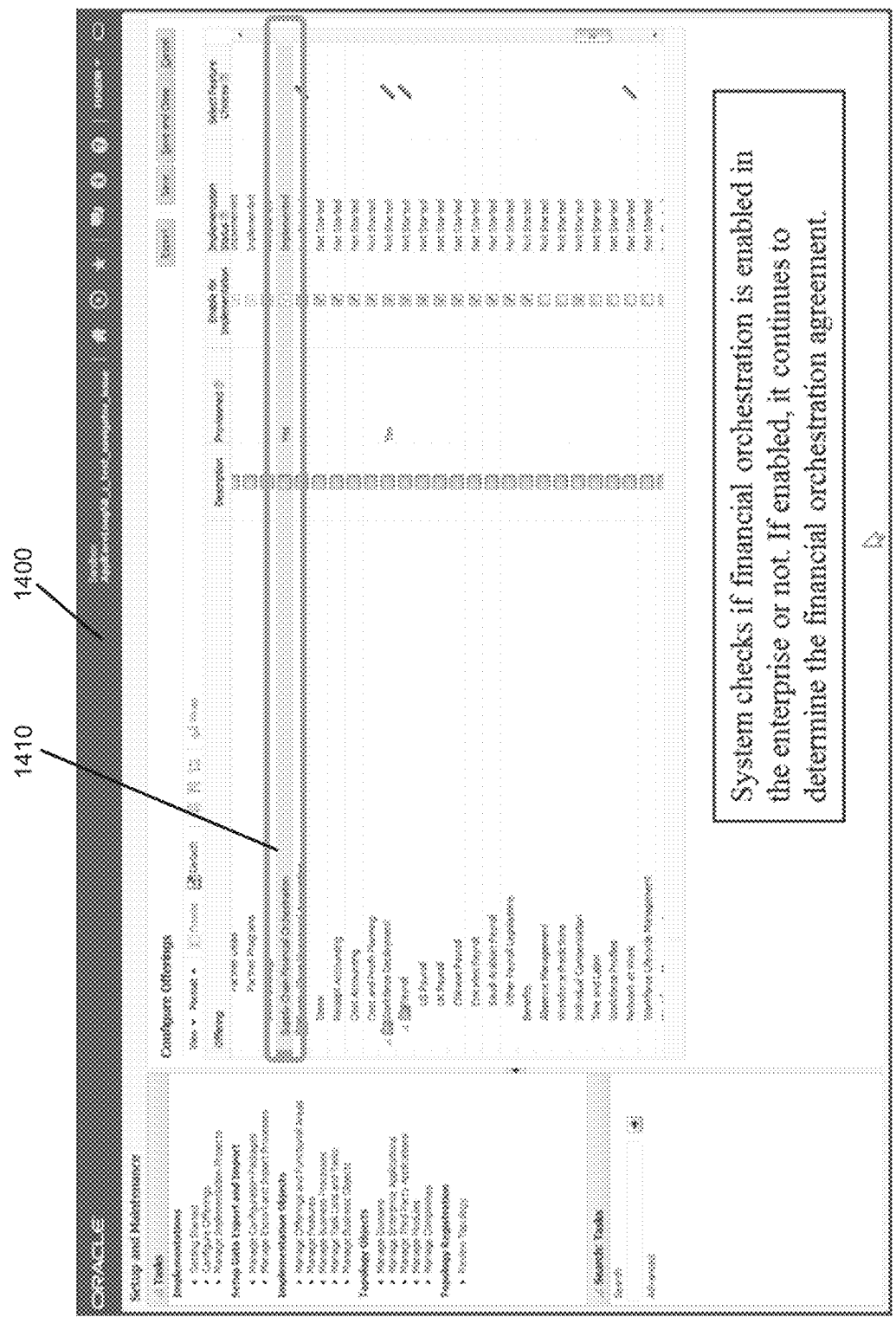
FIG. 14 illustrates a user interface of a purchasing system that displays whether supply chain financial orchestration is enabled for the purchasing system, according to an embodiment of the invention.

FIG. 14 illustrates a user interface 1400 of a purchasing system that displays whether supply chain financial orchestration is enabled for the purchasing system, according to an embodiment of the invention. According to the embodiment, the purchasing system can include one or more functional offerings, where each functional offering can provide additional functionality, and each functionality offering can be either enabled for implementation or not enabled for implementation. An example functional offering is a supply chain financial orchestration offering 1410, which can provide functionality for interfacing with a supply chain financial orchestration system. According to the embodiment, the purchasing system can determine whether supply chain financial orchestration offering 1410 is enabled for the purchasing system. If supply chain financial orchestration offering 1410 is enabled for the purchasing system, the purchasing system can transmit one or more attributes of the purchase order or one or more attributes that are derived from one or more attributes of the purchase order (where such attributes or derived attributes are identified as "qualifiers") to the supply chain financial orchestration system, where the supply chain financial orchestration system can dynamically select a supply chain financial orchestration flow based on the transmitted qualifiers.

Figure 15:
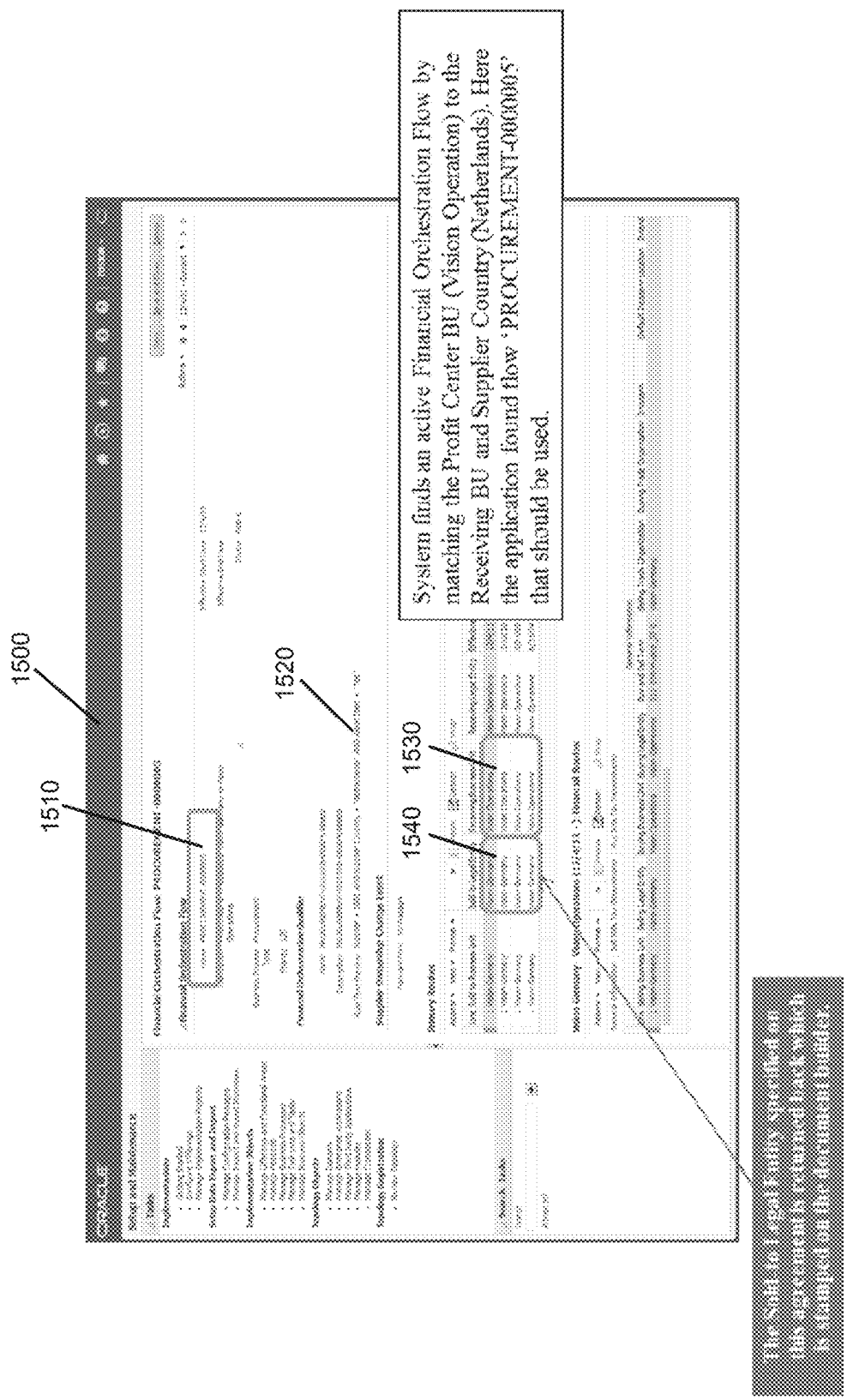
FIG. 15 illustrates a user interface of a supply chain financial orchestration system that displays a supply chain financial orchestration flow that can be dynamically selected by the supply chain financial orchestration system, according to an embodiment of the invention.

FIG. 15 illustrates a user interface 1500 of a supply chain financial orchestration system that displays a supply chain financial orchestration flow that can be dynamically selected by the supply chain financial orchestration system, according to an embodiment of the invention. According to an embodiment, a supply chain financial orchestration flow can be associated with a programmable business rule, where a programmable business rule includes programmable logic that includes a condition and an action, where a condition includes one or more qualifiers, and an action includes an action to select the supply chain financial orchestration flow. In the illustrated embodiment, a supply chain financial orchestration flow 1510, "PROCUREMENT-0000005," is associated with a programmable business rule 1520, "Supplier=1001 AND Supplier Country='Netherlands' AND Asset Item="Yes." According to the illustrated embodiment, the supply chain financial orchestration system can match a profit center business unit of a ship-to organization (i.e., "Vision Operations") of a purchase order with a receiving business unit 1530 (i.e., "Vision Operations") of supply chain financial orchestration flow 1510, and can further match a supplier country (i.e., "Netherlands") of a purchase order with a supplier country (i.e., "Netherlands") of programmable business rule 1520. The supply chain financial orchestration system can dynamically select supply chain financial orchestration flow 1510, and further dynamically select a sold-to legal entity 1540 (i.e., "Vision Germany") of supply chain financial orchestration flow 1510. In one embodiment, the purchasing system can interface with a supply chain financial orchestration system, and the supply chain financial orchestration system can dynamically select supply chain financial orchestration flow 1510, and further dynamically select a sold-to legal entity 1540 of supply chain financial orchestration flow 1510. The supply chain financial orchestration system can subsequently return sold-to legal entity 1540, where sold-to legal entity 1540 can be captured within the document builder.

Figure 16:
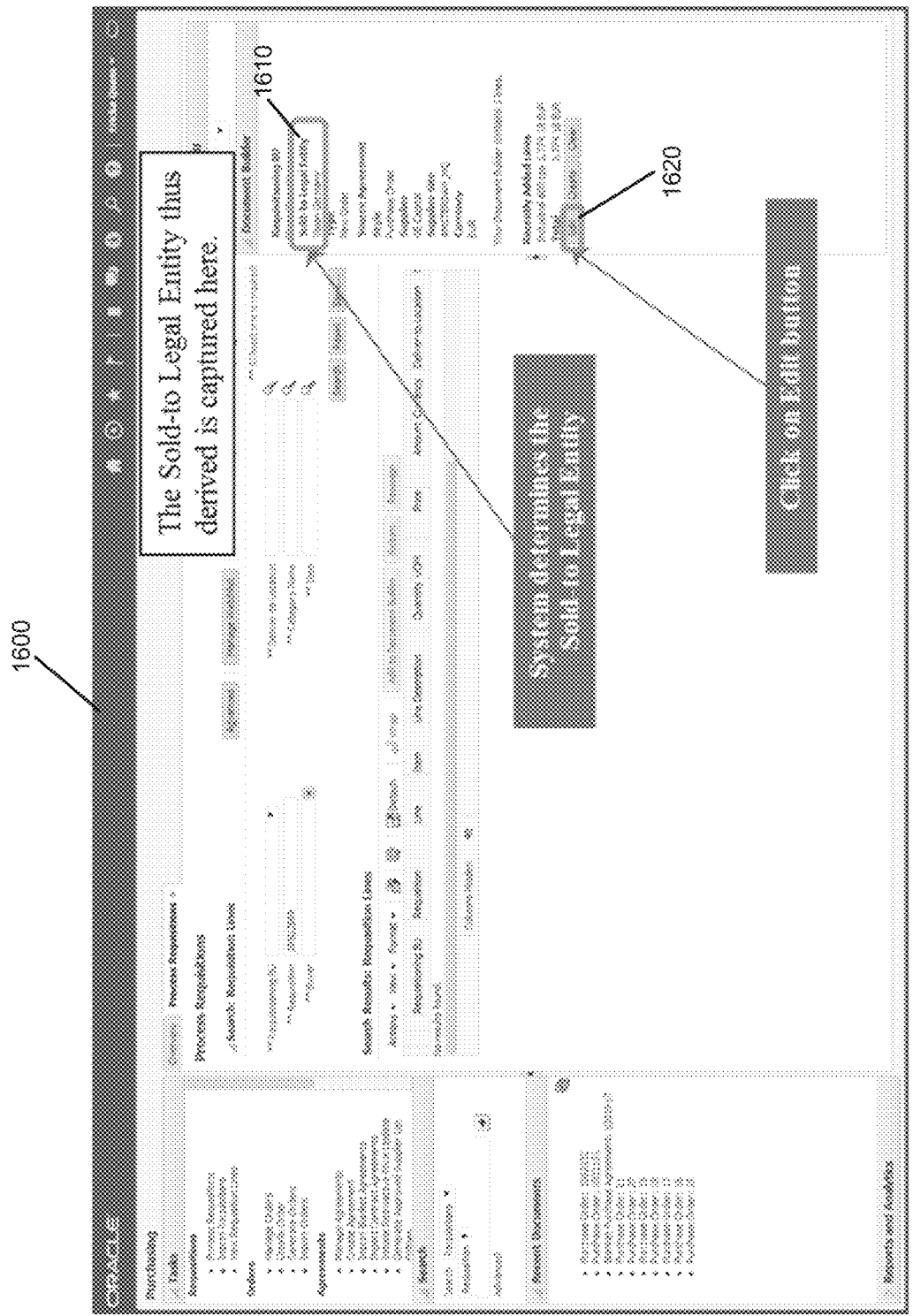
FIG. 16 illustrates a user interface of a purchasing system that displays a sold-to legal entity, where the sold-to legal entity corresponds to the supply chain financial orchestration flow that is dynamically selected by the purchasing system, according to an embodiment of the invention.

FIG. 16 illustrates a user interface 1600 of a purchasing system that displays a sold-to legal entity 1610, where sold-to legal entity 1610 corresponds to the supply chain financial orchestration flow that is dynamically selected by the purchasing system, according to an embodiment of the invention. Sold-to legal entity 1610 (i.e. "Vision Germany") is identical to sold-to legal entity 1540 of FIG. 15, which is the sold-to legal entity that is dynamically determined by the supply chain financial orchestration system. In one embodiment, a user can further edit the document builder by clicking on, or otherwise interacting with, edit button 1620.

Figure 17:
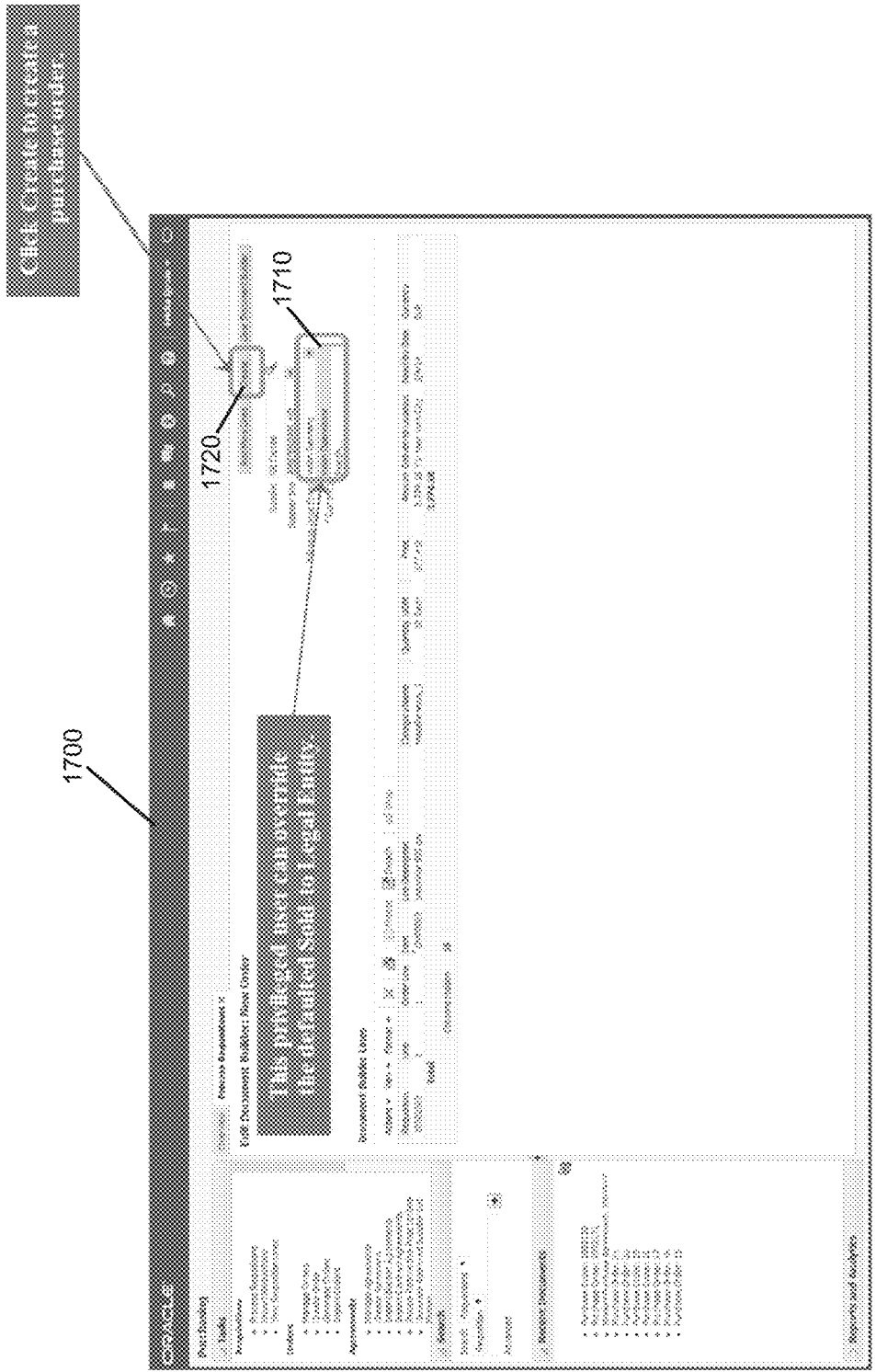
FIG. 17 illustrates a user interface of a purchasing system that is used to override a sold-to legal entity that is dynamically determined by a supply chain financial orchestration system, according to an embodiment of the invention.

FIG. 17 illustrates a user interface 1700 of a purchasing system that is used to override a sold-to legal entity that is dynamically determined by the supply chain financial orchestration system, according to an embodiment of the invention. A user associated with an appropriate override privilege can override a dynamically determined sold-to legal entity. This is because there are situations where the dynamically determined sold-to legal entity is not optimal. For example, the supply chain financial orchestration system may have dynamically determined the sold-to legal entity with a limited number of qualifiers. According to the embodiment, the purchasing system can determine whether a user has an override privilege. If the user has the override privilege, the purchasing system can display a list of possible sold-to legal entities at sold-to legal entity field 1710. The list of possible sold-to legal entities can include all available sold-to legal entities as defined by one or more supply chain financial orchestration flows. The user can select a sold-to legal entity from the list of possible sold-to legal entities displayed within sold-to legal entity field 1710. The user can subsequently click on, or otherwise interact with, create button 1720 to create a purchase order based on the document builder.

Figure 18:
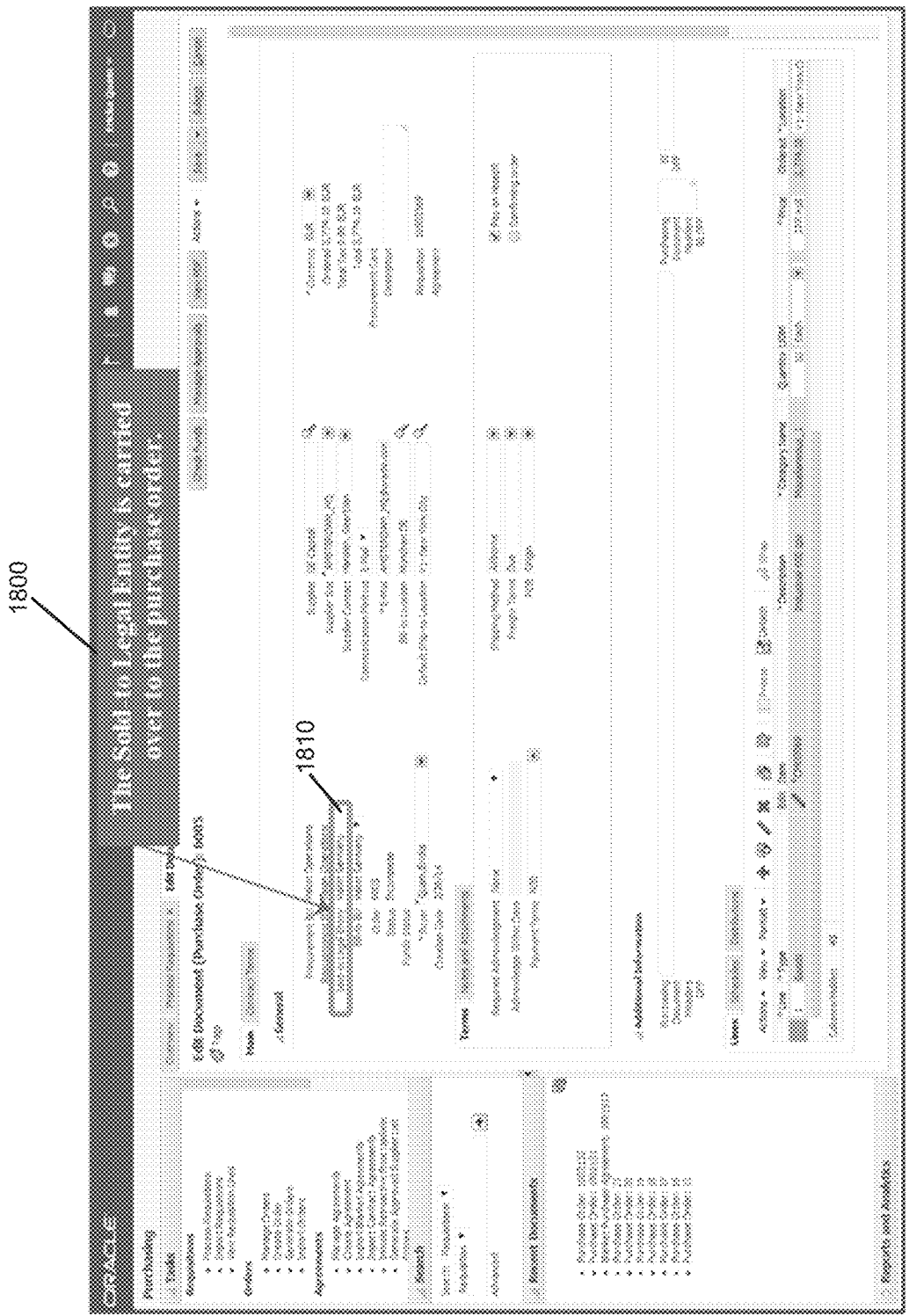
FIG. 18 illustrates a user interface of a purchasing system that displays a generated purchase order that includes a sold-to legal entity that is dynamically determined by a supply chain financial orchestration system, according to an embodiment of the invention.

FIG. 18 illustrates a user interface 1800 of a purchasing system that displays a generated purchase order that includes a sold-to legal entity 1810 that is dynamically determined by a supply chain financial orchestration system, according to an embodiment of the invention. Sold-to legal entity 1810 (i.e. "Vision Germany") is identical to sold-to legal entity 1610 of FIG. 16, which is the sold-to legal entity that is dynamically determined by the supply chain financial orchestration system.

Figure 19:
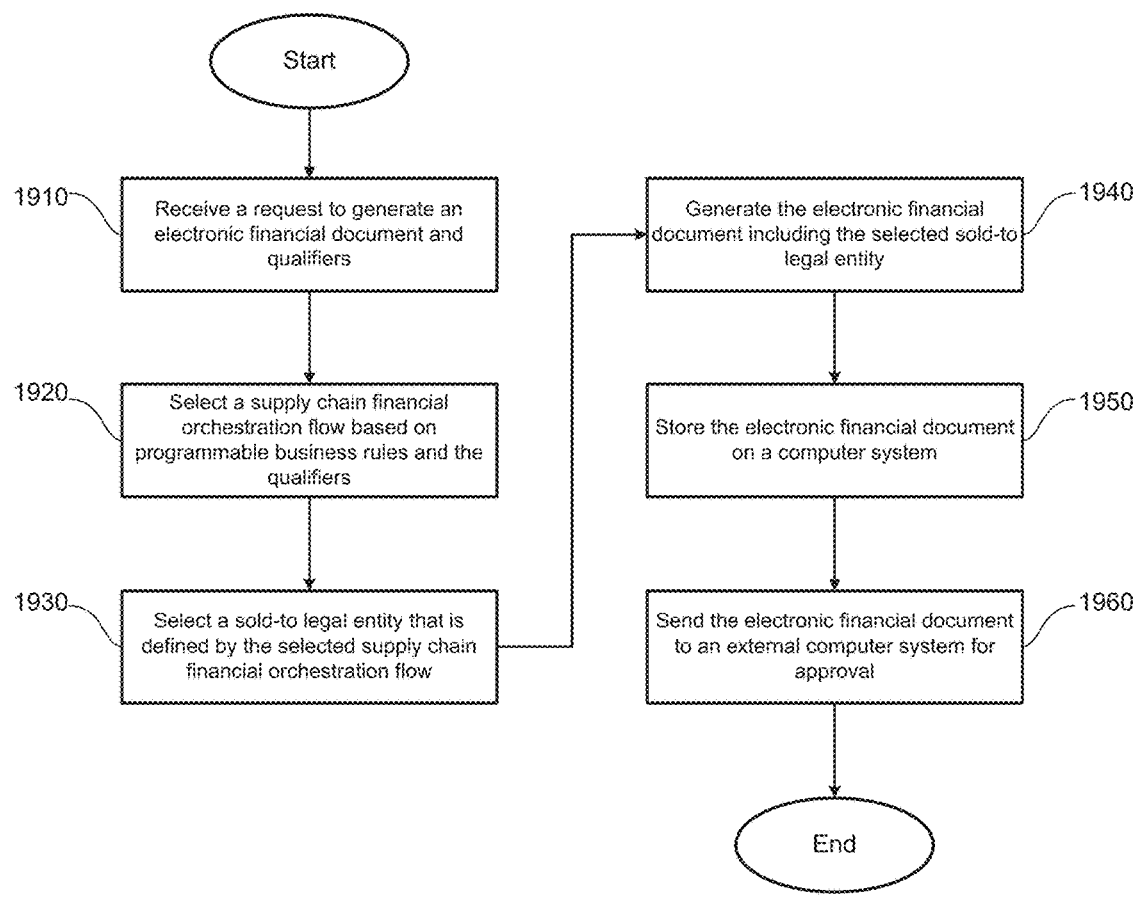
FIG. 19 illustrates a flow diagram of the functionality of a legal entity dynamic determination module, according to an embodiment of the invention.
Figure 20:
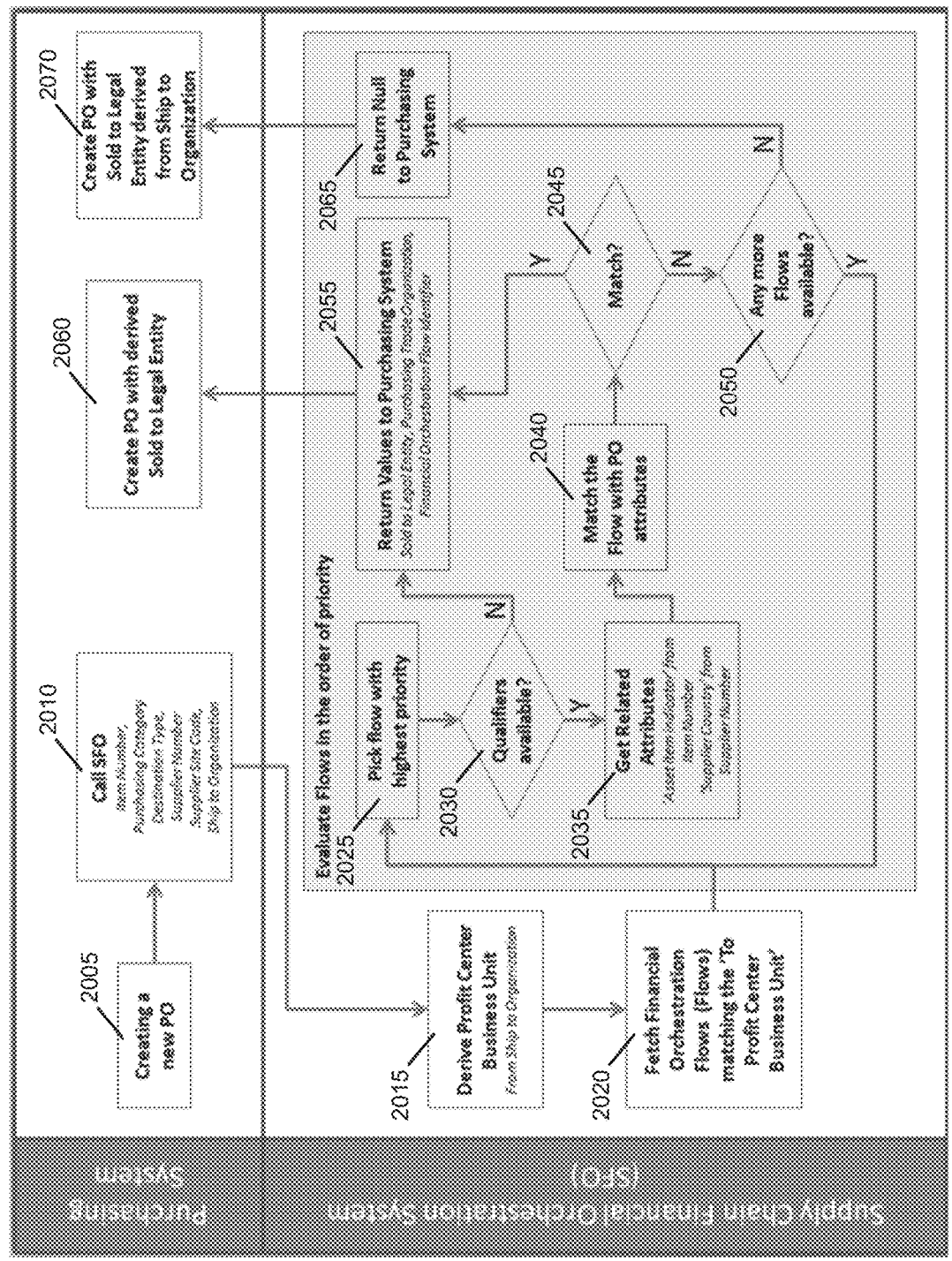
FIG. 20 illustrates a flow diagram of a process that dynamically determines a sold-to legal entity, according to an embodiment of the invention.

FIG. 19 illustrates a flow diagram of the functionality of a legal entity dynamic determination module (such as legal entity dynamic determination module 16 of FIG. 1), according to an embodiment of the invention. In one embodiment, the functionality of the flow diagram of FIG. 19, and the functionality of the flow diagram of FIG. 20, are each implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some, or all, of the functionality may be omitted.

The flow begins and proceeds to 1910. At 1910, a request to generate an electronic financial document and one or more qualifiers are received, where the one or more qualifiers include one or more attributes of the electronic financial document. In certain embodiments, the one or more qualifiers can include one or more derived attributes that are derived from the one or more attributes of the electronic financial document. Further, in certain embodiments, the one or more qualifiers can include at least one of: a supplier, a supplier site, a supplier country, an asset item indicator, a purchasing category, or a profit center business unit of a ship-to organization. Even further, in certain embodiments, the electronic financial document can be an electronic purchase order. In some embodiments, the request to generate the electronic financial document and the one or more qualifiers can be automatically received using a computer system. The flow then proceeds to 1920.

At 1920, a supply chain financial orchestration flow is selected based on one or more programmable business rules and the one or more qualifiers. A programmable business rule can include programmable logic that includes a condition that includes one or more qualifiers, and further includes an action that includes a supply chain financial orchestration flow. In certain embodiments, the supply chain financial orchestration flow can be selected by: selecting a programmable business rule from the one or more programmable business rules, where the one or more qualifiers of the condition of the selected programmable business rule match the one or more qualifiers of the electronic financial document; and selecting the supply chain financial orchestration flow from the action of the selected programmable business rule. In certain embodiments where the one or more qualifiers include a supplier site, the supply chain financial orchestration flow can be selected by: determining a supplier country based on the supplier site; determining an inventory organization based on the supplier country; determining a profit center business unit of a ship-to organization based on the inventory organization; and selecting the supply chain financial orchestration flow that is associated with the profit center business unit of a ship-to organization based on the one or more programmable business rules and the one or more qualifiers. In some embodiments, the supply chain financial orchestration flow can be automatically selected based on the one or more programmable business rules and the one or more qualifiers using the computer system. The flow then proceeds to 1930.

At 1930, a sold-to legal entity that is defined by the selected supply chain financial orchestration flow is selected. In certain embodiments, the sold-to legal entity can be selected by: receiving a request to override the selected sold-to legal entity with a replacement sold-to legal entity; determining whether a user associated with the request has an override privilege; and overriding the selected sold-to legal entity with the replacement sold-to legal entity when the user associated with the request has the override privilege. In some embodiments, the sold-to legal entity that is defined by the selected supply chain financial orchestration flow can be automatically selected using the computer system. The flow then proceeds to 1940.

At 1940, the electronic financial document, including the selected sold-to legal entity is generated. In some embodiments, the electronic financial document can be automatically generated using the computer system. The flow then proceeds to 1950.

At 1950, the electronic financial document is stored on a computer system. The flow then proceeds to 1960.

At 1960, the electronic financial document is sent to an external computer system for approval. The flow then ends.

FIG. 20 illustrates a flow diagram of a process that dynamically determines a sold-to legal entity, according to an embodiment of the invention. The flow begins and proceeds to 2005. At 2005, a purchasing system creates a new purchase order. The flow then proceeds to 2010. At 2010, in order to dynamically determine a sold-to legal entity of the created purchase order, the purchasing system interfaces with a supply chain financial orchestration system. More specifically, the purchasing system calls the supply chain financial orchestration system with the following attributes: item number; purchasing category; supplier number; supplier site code; ship-to organization; and purchase order destination type. The flow then proceeds to 2015.

At 2015, the supply chain financial orchestration order uses the ship-to organization attribute to derive the profit center business unit of the ship-to organization. The flow then proceeds to 2020. At 2020, the supply chain financial orchestration order system fetches one or more supply chain financial orchestration flows which have a receiving business unit identical to the derived profit center business unit of the ship-to organization, and which are effective as of a date when the purchase order was created or is submitted for approval. The flow then proceeds to 2025.

At 2025, the supply chain financial orchestration system selects a supply chain financial orchestration flow with a highest priority from the one or more supply chain financial orchestration flows. The flow then proceeds to 2030. At 2030, it is determined whether the selected supply chain financial orchestration flow is associated with a qualifier rule. If the selected supply chain financial orchestration flow is not associated with a qualifier rule, the flow proceeds to 2055. If the selected supply chain financial orchestration flow is associated with a qualifier rule, the flow proceeds to 2035.

At 2035, the supply chain financial orchestration system derives any additional related attributes that are required, such as an asset item flag of an item or a supplier country.

The flow then proceeds to 2040. At 2040, the supply chain financial orchestration system applies the qualifier rule to the derived related attributes. The flow then proceeds to 2045. At 2045, the supply chain financial orchestration system evaluates whether the derived related attributes satisfy one or more conditions of the qualifier rule (i.e., whether the qualifier rule evaluates to "TRUE" or "FALSE" when applied to the derived related attributes). If the derived related attributes satisfy the one or more conditions of the qualifier rule, the flow proceeds to 2055. If the derived related attributes do not satisfy the one or more conditions of the qualifier rule, the flow proceeds to 2050.

At 2050, the supply chain financial orchestration system determines whether there are any more supply chain financial orchestration flows available. If there are any more supply chain financial orchestration flows available, the flow returns to 2025. If there are not any more supply chain financial orchestration flows available, the flow proceeds to 2065.

At 2055, the supply chain financial orchestration system derives the following values from the selected supply chain financial orchestration flow: a sold-to legal entity; a purchasing trade organization; and a supply chain financial orchestration flow identifier. The supply chain financial orchestration system further sends the aforementioned derived values to the purchasing system. The flow then proceeds to 2060. At 2060, the purchasing system creates the purchase order with the derived sold-to legal entity. The flow then ends.

At 2065, the supply chain financial orchestration system returns a null value to the purchasing system. The flow then proceeds to 2070. At 2070, the purchasing system derives a sold-to legal entity from a ship-to organization, and creates the purchase order with the sold-to legal entity derived from the ship-to organization. The flow then ends.

Thus, a purchasing system is provided that dynamically determines a sold-to legal entity that is associated with a financial document, such as a purchase document. A supply chain financial orchestration system further provides significantly improved flexibility to determine a sold-to legal entity on a purchase order, or other financial document, based on one or more qualifiers (i.e., attributes associated with the purchase order, or attributes derived from attributes associated with the purchase order). Once identified, the purchasing system can enhance the visibility of the sold-to legal entity by capturing the sold-to legal entity explicitly on the purchase order, or other financial document, and displaying the sold-to legal entity within the user interface. Further, the purchasing system does not require unnecessary setup records. Thus, the purchasing system can provide necessary choice to the customer without extensive setup steps. As a result, the purchasing system can enhance user productivity and user experience.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to dynamically determine a sold-to legal entity associated with an electronic document, the determining comprising:

receiving, based on a user's interaction with a user interface, a request to build the electronic document, wherein one or more qualifiers of the electronic document are received from the user via the user interface, at least one of the one or more qualifiers comprising a supplier site;

automatically selecting a programmable business rule from among a plurality programmable business rules using a programmable logic based on qualifiers for conditions of the selected programmable business rule matching qualifiers of the electronic document, wherein, a supplier country qualifier for the electronic document is determined from the supplier site, a supplier organization qualifier for the electronic document is determined based on the supplier country and the supplier site, and a business unit of a ship-to organization qualifier for the electronic document is determined based on the supplier country, and the matched qualifiers include at least the supplier country, the supplier organization, and the business unit of the ship-to organization;

dynamically selecting a supply chain orchestration flow for the electronic document from an action of the selected programmable business rule, wherein the selected supply chain orchestration flow comprises a predetermined relationship between the supplier organization associated with the supplier site and the business unit of the ship-to organization;

automatically selecting a sold-to legal entity that is defined by the selected supply chain orchestration flow;

dynamically displaying an interactive view of the electronic document in the user interface, the interactive view including the automatically selected sold-to legal entity displayed within an interactive element, wherein the interactive element is populated with additional sold-to legal entities defined by one or more of the supply chain orchestration flows, and the interactive element is configured to enable the user to select a replacement sold-to legal entity that overrides the automatically selected sold-to legal entity; and building the electronic document comprising the selected replacement sold-to legal entity and the qualifiers for the electronic document comprising at least the received supplier site, the determined supplier country, and the determined ship-to organization, wherein the built electronic document reflects an override received from the user.

2. The non-transitory computer-readable medium of claim 1, wherein the one or more qualifiers further comprises one or more determined qualifiers that are derived from the one or more received qualifiers.

3. The non-transitory computer-readable medium of claim 1,
wherein the one or more qualifiers comprise at least an asset item indicator that is determined from the one or more received qualifiers.

4. The non-transitory computer-readable medium of claim 1, wherein the determining the sold-to legal entity further comprises:
receiving a request to override the automatically selected sold-to legal entity with the replacement sold-to legal entity selected using the interactive element;
determining whether a user associated with the request has an override privilege; and
overriding the automatically selected sold-to legal entity with the replacement sold-to legal entity when the user associated with the request has the override privilege.

5. The non-transitory computer-readable medium of claim 1, further comprising sending the electronic document to an external computer system for approval.

6. The non-transitory computer-readable medium of claim 1, wherein the electronic document comprises an electronic purchase order.

7. The non-transitory computer-readable medium of claim 1,
wherein the selecting a supply chain orchestration flow further comprises selecting the supply chain orchestration flow with a highest priority.

8. The non-transitory computer-readable medium of claim 7, wherein the automatically selecting the sold-to legal entity that is defined by the selected supply chain orchestration flow further comprises:
deriving the sold-to legal entity from the selected supply chain orchestration flow.

9. The non-transitory computer-readable medium of claim 1, wherein the at least one programmable business rule comprises an action associated with a different supply chain orchestration flow than the selected supply chain orchestration flow, and the different supply chain orchestration flow defines a different sold-to legal entity than the automatically selected sold-to legal entity.

10. The non-transitory computer-readable medium of claim 9, wherein the plurality of programmable business rules are defined by a series of conditions joined together by operators.

11. The non-transitory computer-readable medium of claim 10, wherein the conditions for the selected programmable business rule compare values for the electronic document qualifiers to predetermined comparison values, the operators comprise Boolean operators that join the conditions, and the programmable business rule is selected based on an evaluation of the conditions joined by the operators.

12. A computer-implemented method for dynamically determining a sold-to legal entity associated with an electronic document, the computer-implemented method comprising:
receiving, by a computer processor and based on a user's interaction with a user interface, a request to build the electronic document, wherein one or more qualifiers of the electronic document are received from the user via the user interface, at least one of the one or more qualifiers comprising a supplier site;
automatically selecting a programmable business rule from among a plurality programmable business rules using a programmable logic based on qualifiers for conditions of the selected programmable business rule matching qualifiers of the electronic document, wherein,
a supplier country qualifier for the electronic document is determined from the supplier site, a supplier organization qualifier for the electronic document is determined based on the supplier country and the supplier site, and a business unit of a ship-to organization qualifier for the electronic document is determined based on the supplier country, and
the matched qualifiers include at least the supplier country, the supplier organization, and the business unit of the ship-to organization;
dynamically selecting, by the computer processor, a supply chain orchestration flow for the electronic document from an action of the selected programmable business rule, wherein the selected supply chain orchestration flow comprises a predetermined relationship between the supplier organization associated with the supplier site and the business unit of the ship-to organization;
automatically selecting, by the computer processor, a sold-to legal entity that is defined by the selected supply chain orchestration flow;
dynamically displaying, by the computer processor, an interactive view of the electronic document in the user interface, the interactive view including the automatically selected sold-to legal entity displayed within an interactive element, wherein the interactive element is populated with additional sold-to legal entities defined by one or more of the supply chain orchestration flows, and the interactive element is configured to enable the user to select a replacement sold-to legal entity that overrides the automatically selected sold-to legal entity; and
building, by the computer processor, the electronic document comprising the selected replacement sold-to legal entity and the qualifiers for the electronic document comprising at least the received supplier site, the determined supplier country, and the determined ship-to organization, wherein the built electronic document reflects an override received from the user.

13. The computer-implemented method of claim 12,
wherein the one or more qualifiers comprise at least an asset item indicator that is determined from the one or more received qualifiers.

14. The computer-implemented method of claim 12, wherein the method further comprises:
receiving a request to override the automatically selected sold-to legal entity with the replacement sold-to legal entity selected using the interactive element;
determining whether a user associated with the request has an override privilege; and
overriding the automatically selected sold-to legal entity with the replacement sold-to legal entity when the user associated with the request has the override privilege.

15. A system, comprising:
a hardware processor configured to:
receive, based on a user's interaction with a user interface, a request to build an electronic document, wherein one or more qualifiers of the electronic document are received from the user via the user interface, at least one of the one or more qualifiers comprising a supplier site;

automatically select a programmable business rule from among a plurality programmable business rules using a programmable logic based on qualifiers for conditions of the selected programmable business rule matching qualifiers of the electronic document, wherein,
- a supplier country qualifier for the electronic document is determined from the supplier site, a supplier organization qualifier for the electronic document is determined based on the supplier country and the supplier site, and a business unit of a ship-to organization qualifier for the electronic document is determined based on the supplier country, and
- the matched qualifiers include at least the supplier country, the supplier organization, and the business unit of the ship-to organization;

dynamically selecting a supply chain orchestration flow for the electronic document from an action of the selected programmable business rule, wherein the selected supply chain orchestration flow comprises a predetermined relationship between the supplier organization associated with the supplier site and the business unit of the ship-to organization;

automatically select a sold-to legal entity that is defined by the selected supply chain orchestration flow;

dynamically display an interactive view of the electronic document in the user interface, the interactive view including the automatically selected sold-to legal entity displayed within an interactive element, wherein the interactive element is populated with additional sold-to legal entities defined by one or more of the supply chain orchestration flows, and the interactive element is configured to enable the user to select a replacement sold-to legal entity that overrides the automatically selected sold-to legal entity; and build the electronic financial document comprising the selected replacement sold-to legal entity and the qualifiers for the electronic document comprising at least the received supplier site, the determined supplier country, and the determined ship-to organization, wherein the built electronic document reflects an override received from the user.

16. The system of claim 15,
wherein the one or more qualifiers comprise at least an asset item indicator that is determined from the one or more received qualifiers.

17. The system of claim 15, wherein the system is further configured to:
receive a request to override the automatically selected sold-to legal entity with the replacement sold-to legal entity selected using the interactive element;
determine whether a user associated with the request has an override privilege; and
override the automatically selected sold-to legal entity with the replacement sold-to legal entity when the user associated with the request has the override privilege.

* * * * *